US011136650B2

(12) United States Patent
Pecina et al.

(10) Patent No.: US 11,136,650 B2
(45) Date of Patent: Oct. 5, 2021

(54) POWDERED TITANIUM ALLOY COMPOSITION AND ARTICLE FORMED THEREFROM

(71) Applicant: The Boeing Company, Chicago, IL (US)

(72) Inventors: Joe Pecina, Lynnwood, WA (US); Robert Burkett, Mill Creek, WA (US); Gary M. Backhaus, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/458,231

(22) Filed: Mar. 14, 2017

(65) Prior Publication Data

US 2018/0230577 A1    Aug. 16, 2018

Related U.S. Application Data

(63) Continuation-in-part of application No. 15/219,812, filed on Jul. 26, 2016, now abandoned.

(51) Int. Cl.
*C22C 14/00* (2006.01)
*C22F 1/18* (2006.01)
*B22F 3/15* (2006.01)

(52) U.S. Cl.
CPC .............. *C22C 14/00* (2013.01); *C22F 1/183* (2013.01); *B22F 3/15* (2013.01); *B22F 2301/205* (2013.01)

(58) Field of Classification Search
CPC ........ C22C 14/00; B22F 3/15; B22F 2301/205
See application file for complete search history.

(56) References Cited

U.S. PATENT DOCUMENTS 2,858,209 A * 10/1958 Wyche ................... C22C 14/00
420/417
3,622,406 A * 11/1971 Vordahl ............... C22C 1/0458
148/401
(Continued)

FOREIGN PATENT DOCUMENTS

CN          104148658           11/2014
CN          104711452 A    *    6/2015
(Continued)

OTHER PUBLICATIONS

C.F. Yolton, :The Pre-Alloyed Powder Metallurgy of Titanium with Boron and Carbon Additions 56, Issue 5. pp. 56-59 (2004) (Year: 2004).*

(Continued)

*Primary Examiner* — Paul A Wartalowicz
*Assistant Examiner* — Ryan L Heckman
(74) *Attorney, Agent, or Firm* — Walters & Wasylyna LLC

(57) ABSTRACT

A titanium alloy melt includes about 7.0 to about 9.0 percent by weight vanadium (V), about 3.0 to about 4.5 percent by weight aluminum (Al), about 0.8 to about 1.5 percent by weight iron (Fe), at most about 0.15 percent by weight oxygen (O), and titanium (Ti) and a titanium alloy powder, formed from the titanium alloy melt, includes about 7.0 to about 9.0 percent by weight vanadium (V), about 3.0 to about 4.5 percent by weight aluminum (Al), about 0.8 to about 1.5 percent by weight iron (Fe), at most about 0.18 percent by weight oxygen (O), and titanium (Ti).

45 Claims, 3 Drawing Sheets

(56) References Cited

U.S. PATENT DOCUMENTS

| | | | |
|---|---|---|---|
| 3,802,877 A * | 4/1974 | Parris | C22C 14/00 |
| | | | 420/420 |
| 5,332,545 A | 7/1994 | Love | |
| 2008/0092997 A1* | 4/2008 | Matsumoto | C22C 14/00 |
| | | | 148/669 |
| 2011/0243785 A1* | 10/2011 | Waag | C22C 1/04 |
| | | | 419/23 |
| 2017/0080498 A1* | 3/2017 | Burrow | B22F 5/00 |

FOREIGN PATENT DOCUMENTS

| | | | |
|---|---|---|---|
| CN | 105525141 | | 4/2016 |
| CN | 105779817 | | 7/2016 |
| CN | 105779817 A * | | 7/2016 |
| JP | 03134124 A * | | 6/1991 |
| JP | H03134124 | | 6/1991 |
| JP | 2006-111934 | | 4/2006 |
| RU | 2172359 C1 * | | 8/2001 |

OTHER PUBLICATIONS

Translation of CN-105779817 (Year: 2014).*
Translation of RU2172359 (Year: 1999).*
Qian, M., et al. "Sintering of Titanium and Its Alloys." Sintering of Advanced Materials, 2010, pp. 324-355 (Year: 2010).*
Machine Translation of JP-03134124-A (Year: 1991).*
Qian, Ma, and F. H. Froes. Titanium Powder Metallurgy: Science, Technology, and Applications. Elsevier, 2015 (p. 1) (Year: 2015).*
E. Diderrich, K. Rudinger, G. Turlach, L. Habraken "Addition of Cobalt to the Ti—6Al—4V Alloy" J. of Metals, pp. 29-37 (1968) (Year: 1968).*
Qian, Ma, and F. H. Froes. Titanium Powder Metallurgy: Science, Technology, and Applications. Elsevier, 2015 (p. 2) (Year: 2015).*
Li, S., Yao, W., Liu, J., Yu, M., & Ma, K. (2016). Effect of SiC nanoparticle concentration on the properties of oxide films formed on Ti—10V—2Fe—3Al alloy. Vacuum, 123, 1-7 (Year: 2015).*
Machine Translation of CN-104711452-A (Year: 2015).*
Machine Translation of CN-105779817-A (Year: 2016).*
Kanou, O., Fukada, N., & Hayakawa, M. (2016). The Effect of Fe Addition on the Mechanical Properties of Ti—6Al—4V Alloys Produced by the Prealloyed Powder Method. Materials Transactions, 57(5), 681-685 (Year: 2016).*
Sjafrizal, T., Dehghan-Manshadi, A., Kent, D., Yan, M., & Dargusch, M. S. (2020). Effect of Fe addition on properties of Ti—6Al—xFe manufactured by blended elemental process. Journal of the Mechanical Behavior of Biomedical Materials, 102, 103518 (Year: 2020).*
Kulak et al.; The Effect of Al Addition on the Tribological Behavior of Ti2Si2Zr Alloys; Journal of Tribology, 141 (2019) 041604-1-041604-10 (Year: 2019).*
Ren et al., "Effect of shock-induced martensite transformation on the postshock mechanical response of metastable β titanium alloys," *Journal of Alloys and Compounds*, No. 578, pp. 547-552 (2013).
European Patent Office, Extended European Search Report, EP 17 182 655 (dated Jun. 12, 2017).
Song et al., "Precipitation behavior and tensile property of the stress-aged Ti1OMo8V1Fe3.5A1 alloy", *Materials Science and Engineering Elsevier*, vol. 528, No. 12, pp. 4111-4114, (Jan. 28, 2011).
European Patent Office, "Extended European Search Report," App. No. 19184138.6 (dated Aug. 26, 2019).
Canadian Intellectual Property Office, Office Action, App. No. 2,967,151 (dated Nov. 27, 2019).
European Patent Office, "Communication pursuant to Article 94(3) EPC," App. No. 19 184 138.6 (dated Oct. 7, 2020).
China National Intellectual Property Administration, Office Action, with English translation, App. No. 201710611737.0 (dated Aug. 24, 2020).
Canadian Intellectual Property Office, Office Action, App. No. 2,967,151 (dated Aug. 25, 2020).
Chang et al: "Advances in powder metallurgy: Properties, processing and application," $1^{st}$ ed. Woodhead Publishing Limited, pp. 1-607 (2010).
Qian et al: "Sintering of Titanium and its Alloys," $1^{st}$ ed. Woodhead Publishing Limited, pp. 324-355 (2010).
Jackson et al: "Titanium and its alloys: Processing, Fabrication and Mechanical Performance," Encyclopedia of Aerospace Engineering (2010).
China National Intellectual Property Administration, Office Action, with English translation, App. No. 201710611737.0 (dated Apr. 1, 2021).
Japan Patent Office, Office Action, with English translation, App. No. 2017-135228 (dated Mar. 23, 2021).

* cited by examiner

US 11,136,650 B2

POWDERED TITANIUM ALLOY COMPOSITION AND ARTICLE FORMED THEREFROM

PRIORITY

The present application is a continuation-in-part of, and claims priority from, U.S. Ser. No. 15/219,812 filed on Jul. 26, 2016, which is titled "Powdered Titanium Alloy Composition and Article Formed Therefrom," the entire contents of which are incorporated herein by reference.

FIELD

This application generally relates to titanium alloys and, more particularly, to titanium alloys for powder metallurgy.

BACKGROUND

Titanium alloys offer high tensile strength over a broad temperature range, yet are relatively light weight. Ti-6Al-4V is perhaps the most common and widely used titanium alloy. In wrought form, Ti-6Al-4V has a relatively low density (about 4.47 g/cm$^3$), yet exhibits exceptional mechanical properties, such as a yield strength in excess of 120 ksi (thousand pounds per square inch), an ultimate tensile strength in excess of 130 ksi, an elongation of at least 10 percent, and a fatigue limit (10 million plus cycles) in excess of 90 ksi. Furthermore, titanium alloys are resistant to corrosion. Therefore, titanium alloys, Ti-6Al-4V specifically, are used in various demanding applications, such as aircraft components, medical devices and the like.

Powder metallurgy manufacturing techniques, such as die pressing, metal injection molding, direct hot isostatic pressing and the like, result in the formation of net (or near net) articles. Therefore, powder metallurgy manufacturing techniques offer the opportunity for significant cost savings by significantly reducing (if not completely eliminating) the need for machining operations, which are time intensive and wasteful of materials.

Ti-6Al-4V powders are available, and have been formed into various articles using powder metallurgy manufacturing techniques. However, articles formed from Ti-6Al-4V powders do not have the same mechanical properties as articles formed from wrought Ti-6Al-4V. For example, the fatigue limit of articles formed from Ti-6Al-4V powders can be 20 to 30 percent less that the fatigue limit of articles formed from wrought Ti-6Al-4V (e.g., 70 ksi for powdered versus 95 ksi for wrought). In many applications, such a significant reduction in the fatigue limit may not be acceptable.

Accordingly, those skilled in the art continue with research and development efforts in the field of titanium alloys.

SUMMARY

In one embodiment, the disclosed titanium alloy melt includes about 7.0 to about 9.0 percent by weight vanadium (V), about 3.0 to about 4.5 percent by weight aluminum (Al), about 0.8 to about 1.5 percent by weight iron (Fe), at most about 0.15 percent by weight oxygen (O), and titanium (Ti).

In one embodiment, the disclosed titanium alloy powder includes about 7.0 to about 9.0 percent by weight vanadium (V), about 3.0 to about 4.5 percent by weight aluminum (Al), about 0.8 to about 1.5 percent by weight iron (Fe), at most about 0.18 percent by weight oxygen (O), and titanium (Ti).

In one embodiment, the disclosed method for fabricating a titanium alloy powder includes the steps of: (1) preparing a titanium alloy melt that includes about 7.0 to about 9.0 percent by weight vanadium (V), about 3.0 to about 4.5 percent by weight aluminum (Al), about 0.8 to about 1.5 percent by weight iron (Fe), at most about 0.12 percent by weight oxygen (O), and titanium (Ti), and (2) atomizing the titanium alloy melt to form the titanium alloy powder that includes about 7.0 to about 9.0 percent by weight vanadium (V), about 3.0 to about 4.5 percent by weight aluminum (Al), about 0.8 to about 1.5 percent by weight iron (Fe), at most about 0.14 percent by weight oxygen (O), and titanium (Ti).

Other embodiments of the disclosed titanium alloy composition will become apparent from the following detailed description, the accompanying drawings and the appended claims.

DETAILED DESCRIPTION

Figure 1:
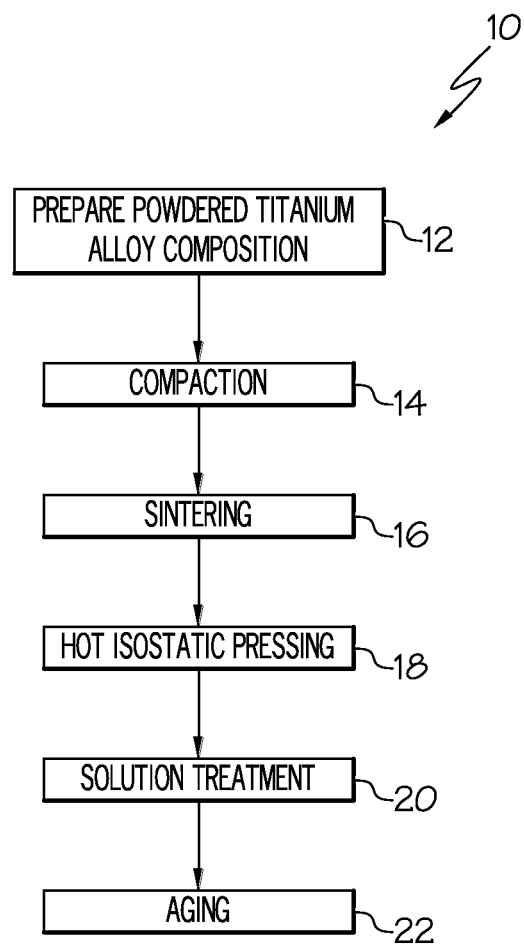
FIG. 1 is a flow diagram depicting one embodiment of the disclosed method for manufacturing an article.

Disclosed is an alpha-beta titanium alloy that may be used in wrought form, powdered form, or compacted and sintered form. Significantly, articles formed from the disclosed titanium alloy using powder metallurgy manufacturing techniques may have mechanical and durability performance properties, such as yield strength and fatigue limit, that are at least as good as (if not better than) the mechanical and durability properties of articles formed from wrought Ti-6Al-4V. Therefore, the disclosed titanium alloy is an alternative to Ti-6Al-4V that is particularly suitable for use in powder metallurgy.

The disclosed alpha-beta titanium alloy includes titanium and at least one stabilizer (e.g., one or more stabilizing elements). The stabilizer may range from about 10 percent by weight to about 18 percent by weight, such as from about 10.94 percent by weight to about 17.62 percent by weight, such as from about 15.76 percent by weight to about 17.01 percent by weight.

The stabilizer (e.g., one or more stabilizers) includes one or more optional components of the alpha-beta titanium alloy of the first embodiment. The stabilizer may include one or more alpha stabilizers (e.g., alpha-stabilizing elements), one or more beta stabilizers (e.g., beta-stabilizing elements), or a combination of alpha stabilizers and beta stabilizers.

As an example, the disclosed alpha-beta titanium alloy includes titanium, at least one alpha stabilizer, and at least one beta stabilizer.

The alpha stabilizer (e.g., one or more alpha stabilizers) may range from about 3.0 percent by weight to about 8.0 percent by weight, such as from about 3.0 percent by weight to about 7.0 percent by weight, such as from about 3.0 percent by weight to about 6.0 percent by weight, such as from about 3.14 percent by weight to about 4.72 percent by weight.

The beta stabilizer (e.g., one or more beta stabilizers) may range from about 7.0 percent by weight to about 13.0 percent by weight, such as from about 7.8 percent by weight to about 12.9 percent by weight, such as from about 7.88 percent by weight to about 10.02 percent by weight.

In one specific, non-limiting example, the titanium alloy has a composition that includes about 7.87 percent by weight of the alpha stabilizer and about 7.88 percent by weight of the beta stabilizer.

In another specific, non-limiting example, the titanium alloy has a composition that includes about 7.0 percent by weight of the alpha stabilizer and about 10.02 percent by weight of the beta stabilizer.

Examples of the alpha stabilizer include, but are not limited to, at least one of aluminum (Al), oxygen (O), tin (Sn), silicon (Si), carbon (C), nitrogen (N), and germanium (Ge).

Examples of the beta stabilizer include, but are not limited to, at least one of vanadium (V), iron (Fe), molybdenum (Mo), tin (Sn), silicon (Si), niobium (Nb), tantalum (Ta), manganese (Mn), nickel (Ni), copper (Cu), silver (Ag), boron (B), cobalt (Co), germanium (Ge), chromium (Cr), and zirconium (Zr).

In a first embodiment, disclosed is an alpha-beta titanium alloy having the composition shown in Table 1. The example composition of the alpha-beta titanium alloy of the first embodiment is an example of a final article made using (e.g., formed from) a powdered titanium alloy composition subjected to a powder metallurgy process such as the disclosed method 10 (FIG. 1).

TABLE 1

| Element | Range (wt %) |
| --- | --- |
| Vanadium | 7.0-9.0 |
| Aluminum | 3.0-4.5 |
| Iron | 0.8-1.5 |
| Oxygen | 0.14-0.22 |
| Chromium | 0 or 0.8-2.4 |
| Cobalt | 0 or 1.2-2.0 |
| Titanium | Balance |

Thus, the alpha-beta titanium alloy of the first embodiment consists essentially of titanium (Ti), vanadium (V), aluminum (Al), iron (Fe), oxygen (O) and, optionally, at least one of chromium (Cr) and cobalt (Co) (one or both of chromium and/or cobalt).

The concentration of vanadium (V) of the titanium alloy of the first embodiment may be range from about 7.0 percent by weight to about 9.0 percent by weight, such as from about 7.0 percent by weight to about 8.0 percent by weight or from about 7.5 percent by weight to about 8.5 percent by weigh.

The concentration of aluminum (Al) of the titanium alloy of the first embodiment may be range from about 3.0 percent by weight to about 4.5 percent by weight, such as from about 3.5 percent by weight to about 4.5 percent by weight or from about 3.0 percent by weight to about 4.0 percent by weight.

The concentration of iron (Fe) of the titanium alloy of the first embodiment may be range from about 0.8 percent by weight to about 1.5 percent by weight, such as from about 0.9 percent by weight to about 1.5 percent by weight or from about 0.8 percent by weight to about 1.3 percent by weight.

Chromium (Cr) is an optional component (e.g., beta stabilizer) of the alpha-beta titanium alloy of the first embodiment. When present, the concentration of chromium may range from about 0.8 percent by weight to about 2.4 percent by weight, such as from about 1.8 percent by weight to about 2.4 percent by weight.

Cobalt (Co) is an optional component (e.g., beta stabilizer) of the alpha-beta titanium alloy of the first embodiment. When present, the concentration of cobalt may range from about 1.2 percent by weight to about 2.0 percent by weight, such as from about 1.6 percent by weight to about 2.0 percent by weight.

Those skilled in the art will appreciate that various impurities, which do not substantially affect the physical properties of the alpha-beta titanium alloy of the first embodiment, may also be present, and the presence of such impurities will not result in a departure from the scope of the present disclosure. For example, the impurities content of the alpha-beta titanium alloy of the first embodiment may be controlled as shown in Table 2.

TABLE 2

| Impurity | Maximum (wt %) |
| --- | --- |
| Carbon | 0.10 |
| Nitrogen | 0.05 |
| Chlorine | 0.05 |
| Hydrogen | 0.015 |
| Silicon | 0.05 |
| Yttrium | 0.005 |
| Sodium | 0.01 |
| Magnesium | 0.10 |
| Other Elements, Each | 0.10 |
| Other Elements, Total | 0.30 |

In a second embodiment, disclosed is an alpha-beta titanium alloy having the composition shown in Table 3. The example composition of the alpha-beta titanium alloy of the second embodiment is an example of a final article made using (e.g., formed from) a powdered titanium alloy composition subjected to a powder metallurgy process such as the disclosed method 10 (FIG. 1).

TABLE 3

| Element | Range (wt %) |
| --- | --- |
| Vanadium | 7.0-8.0 |
| Aluminum | 3.5-4.5 |
| Iron | 0.9-1.5 |
| Oxygen | 0.15-0.22 |
| Titanium | Balance |

Thus, the alpha-beta titanium alloy of the second embodiment consists essentially of titanium (Ti), vanadium (V), aluminum (Al), iron (Fe) and oxygen (O). The impurities content of the alpha-beta titanium alloy of the second embodiment may be controlled as shown in Table 2.

One specific, non-limiting example of a titanium alloy of the second embodiment has the composition shown in Table 4.

TABLE 4

| Element | Target (wt %) |
| --- | --- |
| Vanadium | 7.5 |
| Aluminum | 4.0 |
| Iron | 1.2 |
| Oxygen | 0.20 |
| Titanium | Balance |

In a third embodiment, disclosed is an alpha-beta titanium alloy having the composition shown in Table 5. The example composition of the alpha-beta titanium alloy of the third embodiment is an example of a final article made using (e.g., formed from) a powdered titanium alloy composition subjected to a powder metallurgy process such as the disclosed method 10 (FIG. 1).

TABLE 5

| Element | Range (wt %) |
| --- | --- |
| Vanadium | 7.5-9.0 |
| Aluminum | 3.0-4.0 |
| Chromium | 0.8-2.4 |
| Iron | 0.8-1.3 |
| Oxygen | 0.14-0.20 |
| Titanium | Balance |

Thus, the alpha-beta titanium alloy of the third embodiment consists essentially of titanium (Ti), vanadium (V), aluminum (Al), chromium (Cr), iron (Fe) and oxygen (O). The impurities content of the alpha-beta titanium alloy of the third embodiment may be controlled as shown in Table 2.

One specific, non-limiting example of a titanium alloy of the third embodiment has the composition shown in Table 6.

TABLE 6

| Element | Target (wt %) |
| --- | --- |
| Vanadium | 8.0 |
| Aluminum | 3.5 |
| Chromium | 2.0 |
| Iron | 1.0 |
| Oxygen | 0.18 |
| Titanium | Balance |

In one variation of the third embodiment, the disclosed alpha-beta titanium alloy may have the composition shown in Table 7.

TABLE 7

| Element | Range (wt %) |
| --- | --- |
| Vanadium | 7.5-9.0 |
| Aluminum | 3.0-4.0 |
| Chromium | 1.8-2.4 |
| Iron | 0.8-1.3 |
| Oxygen | 0.14-0.20 |
| Titanium | Balance |

In a fourth embodiment, disclosed is an alpha-beta titanium alloy having the composition shown in Table 8. The example composition of the alpha-beta titanium alloy of the fourth embodiment is an example of a final article made using (e.g., formed from) a powdered titanium alloy composition subjected to a powder metallurgy process such as the disclosed method 10 (FIG. 1).

TABLE 8

| Element | Range (wt %) |
| --- | --- |
| Vanadium | 7.5-9.0 |
| Aluminum | 3.0-4.0 |
| Cobalt | 1.2-2.0 |
| Iron | 0.8-1.3 |
| Oxygen | 0.14-0.20 |
| Titanium | Balance |

Thus, the alpha-beta titanium alloy of the fourth embodiment consists essentially of titanium (Ti), vanadium (V), aluminum (Al), cobalt (Co), iron (Fe) and oxygen (O). The impurities content of the alpha-beta titanium alloy of the third embodiment may be controlled as shown in Table 2.

One specific, non-limiting example of a titanium alloy of the fourth embodiment has the composition shown in Table 9.

TABLE 9

| Element | Target (wt %) |
| --- | --- |
| Vanadium | 8.0 |
| Aluminum | 3.5 |
| Cobalt | 1.8 |
| Iron | 1.0 |
| Oxygen | 0.18 |
| Titanium | Balance |

In one variation of the fourth embodiment, the disclosed alpha-beta titanium alloy may have the composition shown in Table 10.

TABLE 10

| Element | Range (wt %) |
| --- | --- |
| Vanadium | 7.5-9.0 |
| Aluminum | 3.0-4.0 |
| Cobalt | 1.6-2.0 |
| Iron | 0.8-1.3 |
| Oxygen | 0.14-0.20 |
| Titanium | Balance |

The disclosed titanium alloy may be used to manufacture various articles, such as aircraft parts and components, using traditional casting or forging processes, or hybrid processes such as powder metallurgy combined with forging, or rolling, or extrusion, or welding (solid state (linear or rotational friction or inertia) or traditional melting fusion or with filler). Additionally the disclosed titanium alloys may be used for various net shape and near net shape fabrication processes such as additive manufacturing laser, electron beam, plasma arc melting techniques and powder metallurgy additive laser or electron beam sintering techniques. The disclosed titanium alloy may also be used in powdered form to manufacture various articles using powder metallurgy manufacturing techniques. As noted herein, the powdered form of the disclosed titanium alloy (the disclosed powdered titanium alloy composition) is significantly attractive, particularly vis-a-vis Ti-6Al-4V in powdered form, due to an anticipated improvement in the mechanical properties, particularly fatigue limit, of the resulting articles.

Various powdered forms of the disclosed titanium alloy may be used without departing from the scope of the present disclosure. Regarding shape, the powder particles of the disclosed powdered titanium alloy composition may be spherical, flakey, spongy, cylindrical, blocky, acicular or the like. Powder particle shape may be substantially uniform throughout the powdered titanium alloy composition (e.g., all spherical particles) or multiple different shapes may be included in a particular powdered titanium alloy composition. Regarding size, the powder particles of the disclosed powdered titanium alloy composition may have a broad particle size distribution (e.g., a mixture of relatively large and relative small particles) or a narrow particle size distribution (e.g., substantially uniform particle size).

In one expression, the disclosed powdered titanium alloy composition may be prepared as a physical mixture of at least two distinct powder compositions. As one specific, non-limiting example, the disclosed powdered titanium alloy composition may be prepared by mixing a first powder composition (a substantially pure titanium powder) with a second powder composition (a master alloy powder) in sufficient proportions to achieve the compositional limits recited in Table 1.

In another expression, the disclosed powdered titanium alloy composition includes a single powder component, and each powder particle of the single powder component has substantially the same composition. Specifically, each powder particle of the single powder component has a composition within the compositional limits recited in Table 1. Such a powdered titanium alloy composition may be prepared, for example, by atomization, wherein a molten mass having a composition within the compositional limits recited in Table 1 is forced through an orifice.

Also disclosed is a method for manufacturing articles using the disclosed powdered titanium alloy composition. Referring to FIG. 1, one embodiment of the disclosed method for manufacturing an article, generally designated 10, may begin at Block 12 with the step of preparing a powdered titanium alloy composition. The powdered titanium alloy composition prepared at Block 12 may have a composition falling within the compositional limits recited in Table 1.

At Block 14, the powdered titanium alloy composition may be compacted to form a shaped mass. Various compaction techniques may be used without departing from the scope of the present disclosure. As one example, the compaction step (Block 14) may include die pressing. As another example, the compaction step (Block 14) may include cold isostatic pressing. As another example, the compaction step (Block 14) may include metal injection molding. As yet another example, the compaction step (Block 14) may include direct hot isostatic pressing.

At Block 16, the shaped mass may optionally be sintered. Sintering may be required when the compaction step (Block 14) does not simultaneously sinter/consolidate. For example, the sintering step (Block 16) may include heating the shaped mass to an elevated temperature (e.g., about 2,000° F. to about 2,500° F.) and maintaining the shaped mass at the elevated temperature for at least a minimum amount of time (e.g., at least 60 minutes, such as about 90 minutes to about 150 minutes).

At Block 18, the shaped mass (e.g., the sintered shaped mass) may optionally be subjected to hot isostatic pressing ("HIP") to reduce (if not eliminate) voids in the sintered shaped mass. For example, the hot isostatic pressing step (Block 18) may be performed at a pressure ranging from about 13 ksi to about 16 ksi and a temperature ranging from about 1,475° F. to about 1,800° F., and the elevated pressure and temperature may be applied for at least about 60 minutes, such as for about 120 minutes to about 300 minutes.

At Block 20, the shaped mass (e.g., the HIPed and sintered shaped mass) may optionally be solution treated. For example, solution treatment may include reheating the shaped mass from room temperature to a temperature ranging from about 1400° F. to about 1725° F., and maintaining at temperature for approximately 1 hour before rapidly cooling/quench using various quench media, such as, but not limited to, water, ethylene glycol, liquid polymer additives and gas atmospheres/partial pressures that could include argon, nitrogen and helium, individually or combined, along with forced atmosphere fan cooling.

At Block 22, the shaped mass (e.g., the solution treated, HIPed and sintered shaped mass) may optionally be aged. For example, aging may include reheating the shaped mass from room temperature to a temperature ranging from about 900° F. to about 1400° F., and maintaining the shaped mass at temperature for about 2 to about 8 hours before cooling back to room temperature.

Accordingly, the disclosed method 10 may be used to efficiently manufacture articles of various shapes and sized, including articles (e.g., aircraft parts) having complex geometries. Because the articles are produced to net (or near net) shapes, little or no machining is required to finalize the article, thereby significantly reducing both material and labor costs.

Figure 2:
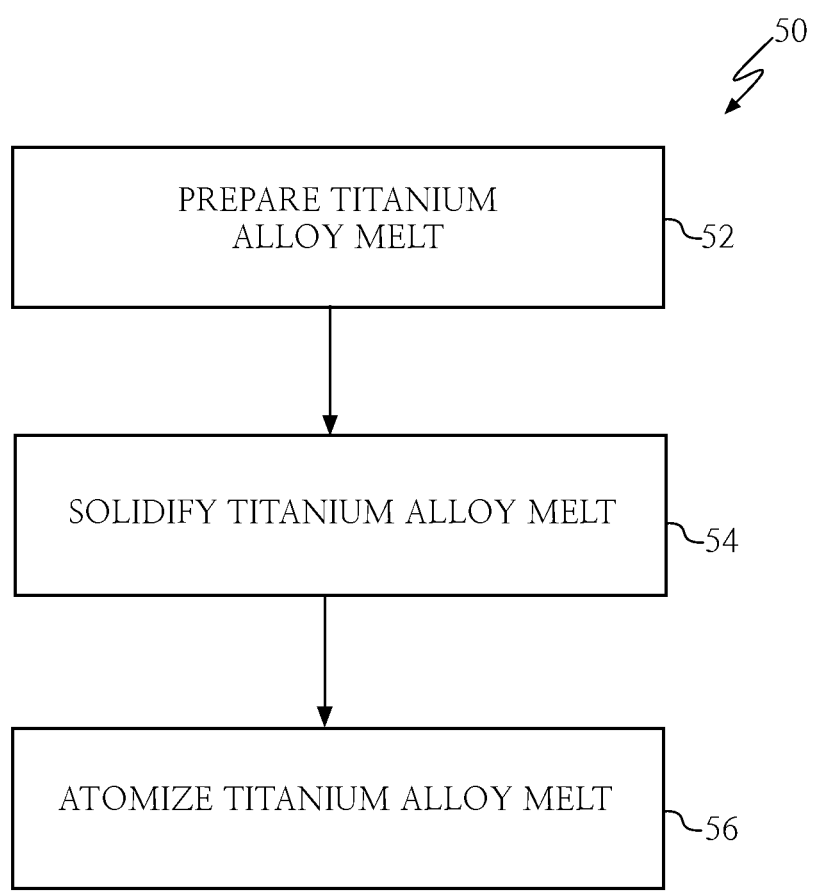
FIG. 2 is a flow diagram depicting one embodiment of disclosed method for fabricating a titanium alloy powder.

Also disclosed is a method for fabricating a titanium alloy powder (e.g., powdered titanium alloy composition). Referring to FIG. 2, one embodiment of the disclosed method for fabricating the titanium alloy powder (e.g., a pre-alloyed powder), generally designated 50, may be an example of the step of preparing a powdered titanium alloy composition (Block 12) of the method 10 (FIG. 1).

The method 50 may begin at Block 52 with the step of preparing a titanium alloy melt. The alloy melt may be prepared by mixing metals and other constituent components and melting the metals and other constituent components into a molten state.

At Block 54, optionally, the molten titanium alloy melt may be solidified to form a solid mass (e.g., solid titanium alloy composition), for example, the titanium alloy in wrought form. As examples, the alloy melt may be solidified into the form of an ingot (e.g., an oblong block), a bar, a wire or another solid form having various shapes.

Thus, the titanium alloy melt may be in molten form (e.g., molten titanium alloy composition) or solid form (e.g., solid titanium alloy composition).

At Block 56, the titanium alloy melt may be atomized to form a titanium alloy powder. Various atomization processes may be utilized depending, for example, on the form (e.g., molten or solid) of the titanium alloy melt. As examples, the alloy melt may be subjected to liquid atomization, gas atomization, centrifugal atomization, plasma atomization, centrifugal disintegration and the like.

The present disclosure recognizes and takes into account that the oxygen content of the titanium alloy composition may increase during the titanium alloy powder fabrication process (e.g., method 50) and/or the titanium alloy article fabrication process (e.g., method 10). Without being limited to any particular theory, it is believed that this increase in oxygen content is due to titanium's inherent propensity to acquire oxygen at its surface during processing and handling. Therefore, it may be particularly beneficial to control (e.g., limit) the oxygen content of the titanium alloy melt and/or the titanium alloy powder during fabrication in order to achieve the desired oxygen content of the titanium alloy disclosed herein and having the compositions shown in Tables 1 and 3-10, for example, having an oxygen content from about 0.14 percent by weight to 0.22 percent by weight.

Accordingly, disclosed herein is a titanium alloy melt that may be utilized to fabricate a titanium alloy powder, which may in turn be utilized to fabricate titanium alloy articles formed using powder metallurgy manufacturing techniques.

In a first embodiment, disclosed is an alpha-beta titanium alloy melt having the composition shown in Table 11. The example composition of the alpha-beta titanium alloy melt of the first embodiment is an example of a titanium alloy melt composition subjected to an atomization process, such as in the disclosed method 50 (FIG. 2), to form a powdered titanium alloy composition that may be subjected to a powder metallurgy process, such as the disclosed method 10 (FIG. 1), to form a final article of a titanium alloy of the first embodiment having the composition shown in Table 1.

TABLE 11

| Element | Range (wt %) |
|---|---|
| Vanadium | 7.0-9.0 |
| Aluminum | 3.0-4.5 |
| Iron | 0.8-1.5 |
| Oxygen | 0-0.15 |
| Chromium | 0 or 0.8-2.4 |
| Cobalt | 0 or 1.2-2.0 |
| Titanium | Balance |

Thus, the alpha-beta titanium alloy melt of the first embodiment consists essentially of titanium (Ti), vanadium (V), aluminum (Al), iron (Fe), oxygen (O) and, optionally, at least one of chromium (Cr) and cobalt (Co) (one or both of chromium and/or cobalt).

The concentration of vanadium (V) of the titanium alloy melt of the first embodiment may be range from about 7.0 percent by weight to about 9.0 percent by weight, such as from about 7.0 percent by weight to about 8.0 percent by weight or from about 7.5 percent by weight to about 8.5 percent by weigh.

The concentration of aluminum (Al) of the titanium alloy melt of the first embodiment may be range from about 3.0 percent by weight to about 4.5 percent by weight, such as from about 3.5 percent by weight to about 4.5 percent by weight or from about 3.0 percent by weight to about 4.0 percent by weight.

The concentration of iron (Fe) of the titanium alloy melt of the first embodiment may be range from about 0.8 percent by weight to about 1.5 percent by weight, such as from about 0.9 percent by weight to about 1.5 percent by weight or from about 0.8 percent by weight to about 1.3 percent by weight.

The concentration of oxygen (O) of the titanium alloy melt of the first embodiment may be at most 0.15 percent by weight, such as at most 0.12 percent by weight. For example, the concentration of oxygen may range from about 0 percent by weight to about 0.15 percent by weight, such as from about 0 percent by weight to about 0.12 percent by weight, such as from about 0.04 percent by weight to about 0.12 percent by weight.

Chromium (Cr) is an optional component (e.g., beta stabilizer) of the alpha-beta titanium alloy melt of the first embodiment. When present, the concentration of chromium may range from about 0.8 percent by weight to about 2.4 percent by weight, such as from about 1.8 percent by weight to about 2.4 percent by weight.

Cobalt (Co) is an optional component (e.g., beta stabilizer) of the alpha-beta titanium alloy melt of the first embodiment. When present, the concentration of cobalt may range from about 1.2 percent by weight to about 2.0 percent by weight, such as from about 1.6 percent by weight to about 2.0 percent by weight.

Those skilled in the art will appreciate that various impurities, which do not substantially affect the physical properties of the alpha-beta titanium alloy melt of the first embodiment, may also be present, and the presence of such impurities will not result in a departure from the scope of the present disclosure. For example, the impurities content of the alpha-beta titanium alloy melt of the first embodiment may be controlled as shown in Table 2.

In a second embodiment, disclosed is an alpha-beta titanium alloy melt having the composition shown in Table 12. The example composition of the alpha-beta titanium alloy melt of the second embodiment is an example of a titanium alloy melt composition subjected to an atomization process, such as in the disclosed method 50 (FIG. 2), to form a powdered titanium alloy composition that may be subjected to a powder metallurgy process, such as the disclosed method 10 (FIG. 1), to form a final article of a titanium alloy of the second embodiment having the composition shown in Table 3.

TABLE 12

| Element | Range (wt %) |
|---|---|
| Vanadium | 7.0-8.0 |
| Aluminum | 3.5-4.5 |
| Iron | 0.9-1.5 |
| Oxygen | 0-0.12 |
| Titanium | Balance |

Thus, the alpha-beta titanium alloy melt of the second embodiment consists essentially of titanium (Ti), vanadium (V), aluminum (Al), iron (Fe) and oxygen (O). The impurities content of the alpha-beta titanium alloy melt of the second embodiment may be controlled as shown in Table 2.

The concentration of oxygen (O) of the titanium alloy melt of the second embodiment may be at most 0.12 percent by weight. For example, the concentration of oxygen may range from about 0 percent by weight to about 0.12 percent by weight, such as from about 0.04 percent by weight to about 0.12 percent by weight.

One specific, non-limiting example of a titanium alloy melt of the second embodiment has the composition shown in Table 13.

TABLE 13

| Element | Target (wt %) |
|---|---|
| Vanadium | 7.5 |
| Aluminum | 4.0 |
| Iron | 1.2 |
| Oxygen | 0.08 |
| Titanium | Balance |

In a third embodiment, disclosed is an alpha-beta titanium alloy melt having the composition shown in Table 14. The example composition of the alpha-beta titanium alloy melt of the third embodiment is an example of a titanium alloy melt composition subjected to an atomization process, such as in the disclosed method 50 (FIG. 2), to form a powdered titanium alloy composition that may be subjected to a powder metallurgy process, such as the disclosed method 10 (FIG. 1), to form a final article of a titanium alloy of the third embodiment having the composition shown in Table 5.

TABLE 14

| Element | Range (wt %) |
|---|---|
| Vanadium | 7.5-9.0 |
| Aluminum | 3.0-4.0 |
| Chromium | 0.8-2.4 |
| Iron | 0.8-1.3 |
| Oxygen | 0-0.12 |
| Titanium | Balance |

Thus, the alpha-beta titanium alloy melt of the third embodiment consists essentially of titanium (Ti), vanadium (V), aluminum (Al), chromium (Cr), iron (Fe) and oxygen (O). The impurities content of the alpha-beta titanium alloy of the third embodiment may be controlled as shown in Table 2.

The concentration of oxygen of the titanium alloy melt of the third embodiment may be at most 0.12 percent by weight. For example, the concentration of oxygen may range from about 0 percent by weight to about 0.12 percent by weight, such as from about 0.04 percent by weight to about 0.12 percent by weight.

One specific, non-limiting example of a titanium alloy melt of the third embodiment has the composition shown in Table 15.

TABLE 15

| Element | Target (wt %) |
|---|---|
| Vanadium | 8.0 |
| Aluminum | 3.5 |
| Chromium | 2.0 |
| Iron | 1.0 |
| Oxygen | 0.08 |
| Titanium | Balance |

In one variation of the third embodiment, the disclosed alpha-beta titanium alloy melt may have the composition shown in Table 16.

TABLE 16

| Element | Range (wt %) |
|---|---|
| Vanadium | 7.5-8.5 |
| Aluminum | 3.0-4.0 |
| Chromium | 0.8-2.4 |
| Iron | 0.8-1.3 |
| Oxygen | 0.4-0.12 |
| Titanium | Balance |

In another variation of the third embodiment, the disclosed alpha-beta titanium alloy melt may have the composition shown in Table 17.

TABLE 17

| Element | Range (wt %) |
|---|---|
| Vanadium | 7.5-8.5 |
| Aluminum | 3.0-4.0 |
| Chromium | 1.8-2.4 |
| Iron | 0.8-1.3 |
| Oxygen | 0.4-0.12 |
| Titanium | Balance |

In a fourth embodiment, disclosed is an alpha-beta titanium alloy melt having the composition shown in Table 18. The example composition of the alpha-beta titanium alloy melt of the fourth embodiment is an example of a titanium alloy melt composition subjected to an atomization process, such as in the disclosed method 50 (FIG. 2), to form a powdered titanium alloy composition that may be subjected to a powder metallurgy process, such as the disclosed method 10 (FIG. 1), to form a final article of a titanium alloy of the fourth embodiment having the composition shown in Table 8.

TABLE 18

| Element | Range (wt %) |
|---|---|
| Vanadium | 7.5-9.0 |
| Aluminum | 3.0-4.0 |
| Cobalt | 1.2-2.0 |
| Iron | 0.8-1.3 |
| Oxygen | 0-0.12 |
| Titanium | Balance |

Thus, the alpha-beta titanium alloy melt of the fourth embodiment consists essentially of titanium (Ti), vanadium (V), aluminum (Al), cobalt (Co), iron (Fe) and oxygen (O). The impurities content of the alpha-beta titanium alloy melt of the third embodiment may be controlled as shown in Table 2.

The concentration of oxygen (O) of the titanium alloy melt of the fourth embodiment may be at most 0.12 percent by weight. For example, the concentration of oxygen may range from about 0 percent by weight to about 0.12 percent by weight, such as from about 0.04 percent by weight to about 0.12 percent by weight.

One specific, non-limiting example of a titanium alloy melt of the fourth embodiment has the composition shown in Table 19.

TABLE 19

| Element | Target (wt %) |
|---|---|
| Vanadium | 8.0 |
| Aluminum | 3.5 |
| Cobalt | 1.8 |
| Iron | 1.0 |
| Oxygen | 0.08 |
| Titanium | Balance |

In one variation of the fourth embodiment, the disclosed alpha-beta titanium alloy melt may have the composition shown in Table 20.

TABLE 20

| Element | Range (wt %) |
|---|---|
| Vanadium | 7.5-8.5 |
| Aluminum | 3.0-4.0 |
| Cobalt | 1.2-2.0 |
| Iron | 0.8-1.3 |
| Oxygen | 0.04-0.12 |
| Titanium | Balance |

In another variation of the fourth embodiment, the disclosed alpha-beta titanium alloy melt may have the composition shown in Table 21.

TABLE 21

| Element | Range (wt %) |
|---|---|
| Vanadium | 7.5-8.5 |
| Aluminum | 3.0-4.0 |
| Cobalt | 1.6-2.0 |
| Iron | 0.8-1.3 |
| Oxygen | 0.04-0.12 |
| Titanium | Balance |

Also disclosed herein is a titanium alloy powder that may be utilized to fabricate titanium alloy articles formed using powder metallurgy manufacturing techniques.

In a first embodiment, disclosed is an alpha-beta titanium alloy powder having the composition shown in Table 22. The example composition of the alpha-beta titanium alloy powder of the first embodiment is an example of a powdered titanium alloy composition that may be subjected to a powder metallurgy process, such as the disclosed method 10 (FIG. 1), to form a final article of a titanium alloy of the first embodiment having the composition shown in Table 1.

TABLE 22

| Element | Range (wt %) |
|---|---|
| Vanadium | 7.0-9.0 |
| Aluminum | 3.0-4.5 |
| Iron | 0.8-1.5 |
| Oxygen | 0-0.18 |
| Chromium | 0 or 0.8-2.4 |
| Cobalt | 0 or 1.2-2.0 |
| Titanium | Balance |

Thus, the alpha-beta titanium alloy powder of the first embodiment consists essentially of titanium (Ti), vanadium (V), aluminum (Al), iron (Fe), oxygen (O) and, optionally, at least one of chromium (Cr) and cobalt (Co) (one or both of chromium and/or cobalt).

The concentration of vanadium (V) of the titanium alloy powder of the first embodiment may be range from about 7.0 percent by weight to about 9.0 percent by weight, such as from about 7.0 percent by weight to about 8.0 percent by weight or from about 7.5 percent by weight to about 8.5 percent by weigh.

The concentration of aluminum (Al) of the titanium alloy powder of the first embodiment may be range from about 3.0 percent by weight to about 4.5 percent by weight, such as from about 3.5 percent by weight to about 4.5 percent by weight or from about 3.0 percent by weight to about 4.0 percent by weight.

The concentration of iron (Fe) of the titanium alloy powder of the first embodiment may be range from about 0.8 percent by weight to about 1.5 percent by weight, such as from about 0.9 percent by weight to about 1.5 percent by weight or from about 0.8 percent by weight to about 1.3 percent by weight.

The concentration of oxygen (O) of the titanium alloy powder of the first embodiment may be at most 0.18 percent by weight, such as at most 0.14 percent by weight. For example, the concentration of oxygen may range from about 0 percent by weight to about 0.18 percent by weight, such as from about 0 percent by weight to about 0.14 percent by weight, such as from about 0.06 percent by weight to about 0.14 percent by weight, such as from about 0.1 percent by weight to about 0.13 percent by weight.

Chromium (Cr) is an optional component (e.g., beta stabilizer) of the alpha-beta titanium alloy powder of the first embodiment. When present, the concentration of chromium may range from about 0.8 percent by weight to about 2.4 percent by weight, such as from about 1.8 percent by weight to about 2.4 percent by weight.

Cobalt (Co) is an optional component (e.g., beta stabilizer) of the alpha-beta titanium alloy powder of the first embodiment. When present, the concentration of cobalt may range from about 1.2 percent by weight to about 2.0 percent by weight, such as from about 1.6 percent by weight to about 2.0 percent by weight.

Those skilled in the art will appreciate that various impurities, which do not substantially affect the physical properties of the alpha-beta titanium alloy powder of the first embodiment, may also be present, and the presence of such impurities will not result in a departure from the scope of the present disclosure. For example, the impurities content of the alpha-beta titanium alloy powder of the first embodiment may be controlled as shown in Table 2.

In a second embodiment, disclosed is an alpha-beta titanium alloy powder having the composition shown in Table 23. The example composition of the alpha-beta titanium alloy powder of the second embodiment is an example of a powdered titanium alloy composition that may be subjected to a powder metallurgy process, such as the disclosed method 10 (FIG. 1), to form a final article of a titanium alloy of the second embodiment having the composition shown in Table 3.

TABLE 23

| Element | Range (wt %) |
|---|---|
| Vanadium | 7.0-8.0 |
| Aluminum | 3.5-4.5 |
| Iron | 0.9-1.5 |
| Oxygen | 0-0.14 |
| Titanium | Balance |

Thus, the alpha-beta titanium alloy powder of the second embodiment consists essentially of titanium (Ti), vanadium (V), aluminum (Al), iron (Fe) and oxygen (O). The impurities content of the alpha-beta titanium alloy powder of the second embodiment may be controlled as shown in Table 2.

The concentration of oxygen (O) of the titanium alloy powder of the second embodiment may be at most 0.14 percent by weight. For example, the concentration of oxygen may range from about 0 percent by weight to about 0.14 percent by weight, such as from about 0.06 percent by weight to about 0.14 percent by weight, such as from about 0.1 percent by weight to about 0.13 percent by weight.

One specific, non-limiting example of a titanium alloy powder of the second embodiment has the composition shown in Table 24.

TABLE 24

| Element | Target (wt %) |
|---|---|
| Vanadium | 7.5 |
| Aluminum | 4.0 |
| Iron | 1.2 |
| Oxygen | 0.12 |
| Titanium | Balance |

In a third embodiment, disclosed is an alpha-beta titanium alloy powder having the composition shown in Table 25. The example composition of the alpha-beta titanium alloy powder of the third embodiment is an example of a powdered titanium alloy composition that may be subjected to a powder metallurgy process, such as the disclosed method 10 (FIG. 1), to form a final article of a titanium alloy of the second embodiment having the composition shown in Table 5.

TABLE 25

| Element | Range (wt %) |
|---|---|
| Vanadium | 7.5-9.0 |
| Aluminum | 3.0-4.0 |
| Chromium | 0.8-2.4 |
| Iron | 0.8-1.3 |
| Oxygen | 0-0.14 |
| Titanium | Balance |

Thus, the alpha-beta titanium alloy powder of the third embodiment consists essentially of titanium (Ti), vanadium (V), aluminum (Al), chromium (Cr), iron (Fe) and oxygen (O). The impurities content of the alpha-beta titanium alloy powder of the third embodiment may be controlled as shown in Table 2.

The concentration of oxygen (O) of the titanium alloy powder of the third embodiment may be at most 0.14 percent by weight. For example, the concentration of oxygen may range from about 0 percent by weight to about 0.14 percent by weight, such as from about 0.06 percent by weight to about 0.14 percent by weight, such as from about 0.1 percent by weight to about 0.13 percent by weight.

One specific, non-limiting example of a titanium alloy powder of the third embodiment has the composition shown in Table 26.

TABLE 26

| Element | Target (wt %) |
| --- | --- |
| Vanadium | 8.0 |
| Aluminum | 3.5 |
| Chromium | 2.0 |
| Iron | 1.0 |
| Oxygen | 0.12 |
| Titanium | Balance |

In one variation of the third embodiment, the disclosed alpha-beta titanium alloy powder may have the composition shown in Table 27.

TABLE 27

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0.6-0.14 |
| Titanium | Balance |

In another variation of the third embodiment, the disclosed alpha-beta titanium alloy powder may have the composition shown in Table 28.

TABLE 28

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.6-0.14 |
| Titanium | Balance |

In a fourth embodiment, disclosed is an alpha-beta titanium alloy powder having the composition shown in Table 29. The example composition of the alpha-beta titanium alloy powder of the fourth embodiment is an example of a powdered titanium alloy composition that may be subjected to a powder metallurgy process, such as the disclosed method 10 (FIG. 1), to form a final article of a titanium alloy of the fourth embodiment having the composition shown in Table 8.

TABLE 29

| Element | Range (wt %) |
| --- | --- |
| Vanadium | 7.5-9.0 |
| Aluminum | 3.0-4.0 |
| Cobalt | 1.2-2.0 |
| Iron | 0.8-1.3 |
| Oxygen | 0-0.14 |
| Titanium | Balance |

Thus, the alpha-beta titanium alloy powder of the fourth embodiment consists essentially of titanium (Ti), vanadium (V), aluminum (Al), cobalt (Co), iron (Fe) and oxygen (O). The impurities content of the alpha-beta titanium alloy powder of the third embodiment may be controlled as shown in Table 2.

The concentration of oxygen (O) of the titanium alloy powder of the fourth embodiment may be at most 0.14 percent by weight. For example, the concentration of oxygen may range from about 0 percent by weight to about 0.14 percent by weight, such as from about 0.06 percent by weight to about 0.14 percent by weight, such as from about 0.1 percent by weight to about 0.13 percent by weight.

One specific, non-limiting example of a titanium alloy powder of the fourth embodiment has the composition shown in Table 30.

TABLE 30

| Element | Target (wt %) |
| --- | --- |
| Vanadium | 8.0 |
| Aluminum | 3.5 |
| Cobalt | 1.8 |
| Iron | 1.0 |
| Oxygen | 0.12 |
| Titanium | Balance |

In one variation of the fourth embodiment, the disclosed alpha-beta titanium alloy powder may have the composition shown in Table 31.

TABLE 31

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0.6-0.14 |
| Titanium | Balance |

In another variation of the fourth embodiment, the disclosed alpha-beta titanium alloy powder may have the composition shown in Table 32.

TABLE 32

| Element | Range (wt %) |
| --- | --- |
| Vanadium | 7.5-8.5 |
| Aluminum | 3.0-4.0 |
| Cobalt | 1.6-2.0 |
| Iron | 0.8-1.3 |
| Oxygen | 0.6-0.14 |
| Titanium | Balance |

The present disclosure further recognizes and takes into account that there may be minimal control over the naturally occurring powder particle size distribution during a pre-alloyed powder fabrication process (e.g., method 50). For example, the yield for powder particle size distribution of less than about 22 microns is typically less than from about 10 percent to about 15 percent of the total size distribution. Therefore, it may be particularly beneficial to include one or more grain refiners in the disclosed titanium alloy melt, which is used to form the disclosed titanium alloy powder, which in turn is used to form the final article of the disclosed titanium alloy.

The grain refiner is utilized to refine the grain size in a titanium alloy powder (e.g., a powdered titanium alloy composition), which may be used to form the titanium alloy disclosed herein. Examples of the grain refiner include, but are not limited to, boron and carbon.

In a fifth embodiment, disclosed is an alpha-beta titanium alloy melt having the composition shown in Table 33.

TABLE 33

| Element | Range (wt %) |
| --- | --- |
| Vanadium | 7.0-9.0 |
| Aluminum | 3.0-4.5 |
| Iron | 0.8-1.5 |
| Oxygen | 0-0.15 |
| Chromium | 0 or 0.8-2.4 |
| Cobalt | 0 or 1.2-2.0 |
| Boron | 0-0.7 |
| Carbon | 0-1.3 |
| Titanium | Balance |

Thus, the alpha-beta titanium alloy melt of the fifth embodiment consists essentially of titanium (Ti), vanadium (V), aluminum (Al), iron (Fe), oxygen (O) and, optionally, at least one of chromium (Cr) and cobalt (Co) (one or both of chromium and/or cobalt) and, optionally, at least one of boron (B) and carbon (C) (one or both of boron and/or carbon).

The concentration of vanadium (V) of the titanium alloy melt of the fifth embodiment may be range from about 7.0 percent by weight to about 9.0 percent by weight, such as from about 7.0 percent by weight to about 8.0 percent by weight or from about 7.5 percent by weight to about 8.5 percent by weight.

The concentration of aluminum (Al) of the titanium alloy melt of the fifth embodiment may be range from about 3.0 percent by weight to about 4.5 percent by weight, such as from about 3.5 percent by weight to about 4.5 percent by weight or from about 3.0 percent by weight to about 4.0 percent by weight.

The concentration of iron (Fe) of the titanium alloy melt of the fifth embodiment may be range from about 0.8 percent by weight to about 1.5 percent by weight, such as from about 0.9 percent by weight to about 1.5 percent by weight or from about 0.8 percent by weight to about 1.3 percent by weight.

The concentration of oxygen (O) of the titanium alloy melt of the fifth embodiment may be at most 0.15 percent by weight, such as at most 0.12 percent by weight. For example, the concentration of oxygen may range from about 0 percent by weight to about 0.15 percent by weight, such as from about 0 percent by weight to about 0.12 percent by weight, such as from about 0.04 percent by weight to about 0.12 percent by weight.

Chromium (Cr) is an optional component (e.g., beta stabilizer) of the alpha-beta titanium alloy melt of the fifth embodiment. When present, the concentration of chromium may range from about 0.8 percent by weight to about 2.4 percent by weight, such as from about 1.8 percent by weight to about 2.4 percent by weight.

Cobalt (Co) is an optional component (e.g., beta stabilizer) of the alpha-beta titanium alloy melt of the fifth embodiment. When present, the concentration of cobalt may range from about 1.2 percent by weight to about 2.0 percent by weight, such as from about 1.6 percent by weight to about 2.0 percent by weight.

Boron (B) is an optional component (e.g., grain refiner) of the alpha-beta titanium alloy melt of the fifth embodiment. When present, the concentration of boron may be at most 0.7 percent by weight. For example, the concentration of boron may range from about 0 percent by weight to about 0.7 percent by weight, such as from about 0 percent by weight to about 0.1 percent by weight, such as from about 0.08 percent by weight to about 0.1 percent by weight, or such as from about 0.3 percent by weight to about 0.5 percent by weight, or such as from about 0.5 percent by weight to about 0.7 percent by weight.

Carbon (C) is an optional component (e.g., grain refiner) of the alpha-beta titanium alloy melt of the fifth embodiment. When present, the concentration of carbon may be at most 1.3 percent by weight. For example, the concentration of carbon may range from about 0 percent by weight to about 1.3 percent by weight, such as from about 0.4 percent by weight to about 1.0 percent by weight, or such as from about 1.0 percent by weight to about 1.3 percent by weight.

In a fifth embodiment, disclosed is an alpha-beta titanium alloy powder having the composition shown in Table 34. The example composition of the alpha-beta titanium alloy powder of the fifth embodiment is an example of a powdered titanium alloy composition formed from a titanium alloy melt of the fifth embodiment having the composition shown in Table 33 and subjected to an atomization process, such as disclosed in the method 50 (FIG. 2).

TABLE 34

| Element | Range (wt %) |
| --- | --- |
| Vanadium | 7.0-9.0 |
| Aluminum | 3.0-4.5 |
| Iron | 0.8-1.5 |
| Oxygen | 0-0.18 |
| Chromium | 0 or 0.8-2.4 |
| Cobalt | 0 or 1.2-2.0 |
| Boron | 0-0.7 |
| Carbon | 0-1.3 |
| Titanium | Balance |

Thus, the alpha-beta titanium alloy powder of the fifth embodiment consists essentially of titanium (Ti), vanadium (V), aluminum (Al), iron (Fe), oxygen (O) and, optionally, at least one of chromium (Cr) and cobalt (Co) (one or both of chromium and/or cobalt) and, optionally, at least one of boron (B) and carbon (C) (one or both of boron and/or carbon).

The concentration of vanadium (V) of the titanium alloy powder of the fifth embodiment may be range from about 7.0 percent by weight to about 9.0 percent by weight, such as from about 7.0 percent by weight to about 8.0 percent by weight or from about 7.5 percent by weight to about 8.5 percent by weigh.

The concentration of aluminum (Al) of the titanium alloy powder of the fifth embodiment may be range from about 3.0 percent by weight to about 4.5 percent by weight, such as from about 3.5 percent by weight to about 4.5 percent by weight or from about 3.0 percent by weight to about 4.0 percent by weight.

The concentration of iron (Fe) of the titanium alloy powder of the fifth embodiment may be range from about 0.8 percent by weight to about 1.5 percent by weight, such as from about 0.9 percent by weight to about 1.5 percent by weight or from about 0.8 percent by weight to about 1.3 percent by weight.

The concentration of oxygen (O) of the titanium alloy powder of the fifth embodiment may be at most 0.18 percent by weight, such as at most 0.14 percent by weight. For example, the concentration of oxygen may range from about 0 percent by weight to about 0.18 percent by weight, such as from about 0 percent by weight to about 0.14 percent by weight, such as from about 0.06 percent by weight to about 0.14 percent by weight, such as from about 0.1 percent by weight to about 0.13 percent by weight.

Chromium (Cr) is an optional component (e.g., beta stabilizer) of the alpha-beta titanium alloy powder of the fifth embodiment. When present, the concentration of chromium may range from about 0.8 percent by weight to about 2.4 percent by weight, such as from about 1.8 percent by weight to about 2.4 percent by weight.

Cobalt (Co) is an optional component (e.g., beta stabilizer) of the alpha-beta titanium alloy powder of the fifth embodiment. When present, the concentration of cobalt may range from about 1.2 percent by weight to about 2.0 percent by weight, such as from about 1.6 percent by weight to about 2.0 percent by weight.

Boron (B) is an optional component (e.g., grain refiner) of the alpha-beta titanium alloy powder of the fifth embodiment. When present, the concentration of boron may be at most 0.7 percent by weight. For example, the concentration of boron may range from about 0 percent by weight to about 0.7 percent by weight, such as from about 0 percent by weight to about 0.1 percent by weight, such as from about 0.08 percent by weight to about 0.1 percent by weight, or such as from about 0.3 percent by weight to about 0.5 percent by weight, or such as from about 0.5 percent by weight to about 0.7 percent by weight.

Carbon (C) is an optional component (e.g., grain refiner) of the alpha-beta titanium alloy powder of the fifth embodiment. When present, the concentration of carbon may be at most 1.3 percent by weight. For example, the concentration of carbon may range from about 0 percent by weight to about 1.3 percent by weight, such as from about 0.4 percent by weight to about 1.0 percent by weight, or such as from about 1.0 percent by weight to about 1.3 percent by weight.

In a fifth embodiment, disclosed is an alpha-beta titanium alloy having the composition shown in Table 35. The example composition of the alpha-beta titanium alloy of the fifth embodiment is an example of a final article made using (e.g., formed from) a titanium alloy powder of the fifth embodiment having the composition shown in Table 34 and subjected to a powder metallurgy process such as the disclosed method 10 (FIG. 1).

TABLE 35

| Element | Range (wt %) |
| --- | --- |
| Vanadium | 7.0-9.0 |
| Aluminum | 3.0-4.5 |
| Iron | 0.8-1.5 |
| Oxygen | 0.14-0.22 |
| Chromium | 0 or 0.8-2.4 |
| Cobalt | 0 or 1.2-2.0 |
| Boron | 0-0.7 |
| Carbon | 0-1.3 |
| Titanium | Balance |

Thus, the alpha-beta titanium alloy of the fifth embodiment consists essentially of titanium (Ti), vanadium (V), aluminum (Al), iron (Fe), oxygen (O) and, optionally, at least one of chromium (Cr) and cobalt (Co) (one or both of chromium and/or cobalt) and, optionally, at least one of boron (B) and carbon (C) (one or both of boron and/or carbon).

The concentration of vanadium (V) of the titanium alloy of the fifth embodiment may be range from about 7.0 percent by weight to about 9.0 percent by weight, such as from about 7.0 percent by weight to about 8.0 percent by weight or from about 7.5 percent by weight to about 8.5 percent by weigh.

The concentration of aluminum (Al) of the titanium alloy of the fifth embodiment may be range from about 3.0 percent by weight to about 4.5 percent by weight, such as from about 3.5 percent by weight to about 4.5 percent by weight or from about 3.0 percent by weight to about 4.0 percent by weight.

The concentration of iron (Fe) of the titanium alloy of the fifth embodiment may be range from about 0.8 percent by weight to about 1.5 percent by weight, such as from about 0.9 percent by weight to about 1.5 percent by weight or from about 0.8 percent by weight to about 1.3 percent by weight.

The concentration of oxygen (O) of the titanium alloy of the fifth embodiment may range from about 0.15 percent by weight to about 0.22 percent by weight.

Chromium (Cr) is an optional component (e.g., beta stabilizer) of the alpha-beta titanium alloy of the fifth embodiment. When present, the concentration of chromium may range from about 0.8 percent by weight to about 2.4 percent by weight, such as from about 1.8 percent by weight to about 2.4 percent by weight.

Cobalt (Co) is an optional component (e.g., beta stabilizer) of the alpha-beta titanium alloy of the fifth embodiment. When present, the concentration of cobalt may range from about 1.2 percent by weight to about 2.0 percent by weight, such as from about 1.6 percent by weight to about 2.0 percent by weight.

Boron (B) is an optional component (e.g., grain refiner) of the alpha-beta titanium alloy of the fifth embodiment. When present, the concentration of boron may be at most 0.7 percent by weight. For example, the concentration of boron may range from about 0 percent by weight to about 0.7 percent by weight, such as from about 0 percent by weight to about 0.1 percent by weight, such as from about 0.08 percent by weight to about 0.1 percent by weight, or such as from about 0.3 percent by weight to about 0.5 percent by weight, or such as from about 0.5 percent by weight to about 0.7 percent by weight.

Carbon (C) is an optional component (e.g., grain refiner) of the alpha-beta titanium alloy of the fifth embodiment. When present, the concentration of carbon may be at most 1.3 percent by weight. For example, the concentration of carbon may range from about 0 percent by weight to about 1.3 percent by weight, such as from about 0.4 percent by weight to about 1.0 percent by weight, or such as from about 1.0 percent by weight to about 1.3 percent by weight.

Those skilled in the art will appreciate that various impurities, which do not substantially affect the physical properties of the titanium alloy melt of the fifth embodiment, the titanium alloy powder of the fifth embodiment and/or the titanium alloy of the fifth embodiment may also be present, and the presence of such impurities will not result in a departure from the scope of the present disclosure. For example, the impurities content of the titanium alloy melt of the fifth embodiment, the titanium alloy powder of the fifth embodiment and/or the titanium alloy of the fifth embodiment may be controlled as shown in Table 36.

TABLE 36

| Impurity | Maximum (wt %) |
| --- | --- |
| Nitrogen | 0.05 |
| Chlorine | 0.05 |
| Hydrogen | 0.015 |
| Silicon | 0.05 |
| Yttrium | 0.005 |
| Sodium | 0.01 |
| Magnesium | 0.10 |

TABLE 36-continued

| Impurity | Maximum (wt %) |
| --- | --- |
| Other Elements, Each | 0.10 |
| Other Elements, Total | 0.30 |

In a sixth embodiment, disclosed is an alpha-beta titanium alloy melt having the composition shown in Table 37.

TABLE 37

| Element | Range (wt %) |
| --- | --- |
| Vanadium | 7.0-8.0 |
| Aluminum | 3.5-4.5 |
| Iron | 0.9-1.5 |
| Oxygen | 0-0.12 |
| Boron | 0.08-0.1 |
| Titanium | Balance |

Thus, the alpha-beta titanium alloy melt of the sixth embodiment consists essentially of titanium (Ti), vanadium (V), aluminum (Al), iron (Fe), oxygen (O) and boron (B). The impurities content of the alpha-beta titanium alloy melt of the sixth embodiment may be controlled as shown in Table 36.

One specific, non-limiting example of a titanium alloy melt of the sixth embodiment has the composition shown in Table 38.

TABLE 38

| Element | Target (wt %) |
| --- | --- |
| Vanadium | 7.5 |
| Aluminum | 4.0 |
| Iron | 1.2 |
| Oxygen | 0.08 |
| Boron | 0.09 |
| Titanium | Balance |

In a sixth embodiment, disclosed is an alpha-beta titanium alloy powder having the composition shown in Table 39. The example composition of the alpha-beta titanium alloy powder of the sixth embodiment is an example of a powdered titanium alloy composition formed from a titanium alloy melt of the sixth embodiment having the composition shown in Table 37 and subjected to an atomization process, such as disclosed in the method 50 (FIG. 2).

TABLE 39

| Element | Range (wt %) |
| --- | --- |
| Vanadium | 7.0-8.0 |
| Aluminum | 3.5-4.5 |
| Iron | 0.9-1.5 |
| Oxygen | 0-0.14 |
| Boron | 0.08-0.1 |
| Titanium | Balance |

Thus, the alpha-beta titanium alloy powder of the sixth embodiment consists essentially of titanium (Ti), vanadium (V), aluminum (Al), iron (Fe), oxygen (O) and boron (B). The impurities content of the alpha-beta titanium alloy powder of the second embodiment may be controlled as shown in Table 36.

One specific, non-limiting example of a titanium alloy powder of the sixth embodiment has the composition shown in Table 40.

TABLE 40

| Element | Target (wt %) |
| --- | --- |
| Vanadium | 7.5 |
| Aluminum | 4.0 |
| Iron | 1.2 |
| Oxygen | 0.10 |
| Boron | 0.09 |
| Titanium | Balance |

In a sixth embodiment, disclosed is an alpha-beta titanium alloy having the composition shown in Table 41. The example composition of the alpha-beta titanium alloy of the sixth embodiment is an example of a final article made using (e.g., formed from) a titanium alloy powder of the sixth embodiment having the composition shown in Table 39 and subjected to a powder metallurgy process such as the disclosed method 10 (FIG. 1).

TABLE 41

| Element | Range (wt %) |
| --- | --- |
| Vanadium | 7.0-8.0 |
| Aluminum | 3.5-4.5 |
| Iron | 0.9-1.5 |
| Oxygen | 0.15-0.22 |
| Boron | 0.08-0.1 |
| Titanium | Balance |

Thus, the alpha-beta titanium alloy of the sixth embodiment consists essentially of titanium (Ti), vanadium (V), aluminum (Al), iron (Fe), oxygen (O) and boron (B). The impurities content of the alpha-beta titanium alloy melt of the sixth embodiment may be controlled as shown in Table 36.

One specific, non-limiting example of a titanium alloy of the sixth embodiment has the composition shown in Table 42.

TABLE 42

| Element | Target (wt %) |
| --- | --- |
| Vanadium | 7.5 |
| Aluminum | 4.0 |
| Iron | 1.2 |
| Oxygen | 0.20 |
| Boron | 0.09 |
| Titanium | Balance |

In a seventh embodiment, disclosed is an alpha-beta titanium alloy melt having the composition shown in Table 43.

TABLE 43

| Element | Range (wt %) |
| --- | --- |
| Vanadium | 7.0-8.0 |
| Aluminum | 3.5-4.5 |
| Iron | 0.9-1.5 |
| Oxygen | 0-0.12 |
| Carbon | 0.4-1.0 |
| Titanium | Balance |

Thus, the alpha-beta titanium alloy melt of the seventh embodiment consists essentially of titanium (Ti), vanadium (V), aluminum (Al), iron (Fe), oxygen (O) and carbon (C). The impurities content of the alpha-beta titanium alloy melt of the sixth embodiment may be controlled as shown in Table 36.

One specific, non-limiting example of a titanium alloy melt of the seventh embodiment has the composition shown in Table 44.

TABLE 44

| Element | Target (wt %) |
|---|---|
| Vanadium | 7.5 |
| Aluminum | 4.0 |
| Iron | 1.2 |
| Oxygen | 0.08 |
| Carbon | 1.0 |
| Titanium | Balance |

In a seventh embodiment, disclosed is an alpha-beta titanium alloy powder having the composition shown in Table 45. The example composition of the alpha-beta titanium alloy powder of the seventh embodiment is an example of a powdered titanium alloy composition formed from a titanium alloy melt of the seventh embodiment having the composition shown in Table 43 and subjected to an atomization process, such as disclosed in the method 50 (FIG. 2).

TABLE 45

| Element | Range (wt %) |
|---|---|
| Vanadium | 7.0-8.0 |
| Aluminum | 3.5-4.5 |
| Iron | 0.9-1.5 |
| Oxygen | 0-0.14 |
| Carbon | 0.4-1.0 |
| Titanium | Balance |

Thus, the alpha-beta titanium alloy powder of the seventh embodiment consists essentially of titanium (Ti), vanadium (V), aluminum (Al), iron (Fe), oxygen (O) and carbon (C). The impurities content of the alpha-beta titanium alloy powder of the second embodiment may be controlled as shown in Table 36.

One specific, non-limiting example of a titanium alloy powder of the seventh embodiment has the composition shown in Table 46.

TABLE 46

| Element | Target (wt %) |
|---|---|
| Vanadium | 7.5 |
| Aluminum | 4.0 |
| Iron | 1.2 |
| Oxygen | 0.12 |
| Carbon | 1.0 |
| Titanium | Balance |

In a seventh embodiment, disclosed is an alpha-beta titanium alloy having the composition shown in Table 47. The example composition of the alpha-beta titanium alloy of the seventh embodiment is an example of a final article made using (e.g., formed from) a titanium alloy powder of the seventh embodiment having the composition shown in Table 45 and subjected to a powder metallurgy process such as the disclosed method 10 (FIG. 1).

TABLE 47

| Element | Range (wt %) |
|---|---|
| Vanadium | 7.0-8.0 |
| Aluminum | 3.5-4.5 |

TABLE 47-continued

| Element | Range (wt %) |
|---|---|
| Iron | 0.9-1.5 |
| Oxygen | 0.15-0.22 |
| Carbon | 0.4-1.0 |
| Titanium | Balance |

Thus, the alpha-beta titanium alloy of the seventh embodiment consists essentially of titanium (Ti), vanadium (V), aluminum (Al), iron (Fe), oxygen (O) and carbon (C). The impurities content of the alpha-beta titanium alloy melt of the sixth embodiment may be controlled as shown in Table 36.

One specific, non-limiting example of a titanium alloy of the seventh embodiment has the composition shown in Table 48.

TABLE 48

| Element | Target (wt %) |
|---|---|
| Vanadium | 7.5 |
| Aluminum | 4.0 |
| Iron | 1.2 |
| Oxygen | 0.20 |
| Carbon | 1.0 |
| Titanium | Balance |

In an eighth embodiment, disclosed is an alpha-beta titanium alloy melt having the composition shown in Table 49.

TABLE 49

| Element | Range (wt %) |
|---|---|
| Vanadium | 7.5-8.5 |
| Aluminum | 3.0-4.0 |
| Chromium | 0.8-2.4 |
| Iron | 0.8-1.3 |
| Oxygen | 0-0.12 |
| Boron | 0.08-0.1 |
| Titanium | Balance |

Thus, the alpha-beta titanium alloy melt of the eighth embodiment consists essentially of titanium (Ti), vanadium (V), aluminum (Al), chromium (Cr), iron (Fe), oxygen (O) and boron (B). The impurities content of the alpha-beta titanium alloy melt of the sixth embodiment may be controlled as shown in Table 36.

One specific, non-limiting example of a titanium alloy melt of the eighth embodiment has the composition shown in Table 50.

TABLE 50

| Element | Target (wt %) |
|---|---|
| Vanadium | 8.0 |
| Aluminum | 3.5 |
| Chromium | 2.0 |
| Iron | 1.0 |
| Oxygen | 0.08 |
| Boron | 0.09 |
| Titanium | Balance |

In one variation of the eighth embodiment, the disclosed alpha-beta titanium alloy melt may have the composition shown in Table 51.

TABLE 51

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.04-0.12 |
| Boron | 0.08-0.1 |
| Titanium | Balance |

In an eighth embodiment, disclosed is an alpha-beta titanium alloy powder having the composition shown in Table 52. The example composition of the alpha-beta titanium alloy powder of the eighth embodiment is an example of a powdered titanium alloy composition formed from a titanium alloy melt of the eighth embodiment having the composition shown in Table 49 and subjected to an atomization process, such as disclosed in the method 50 (FIG. 2).

TABLE 52

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0-0.14 |
| Boron | 0.08-0.1 |
| Titanium | Balance |

Thus, the alpha-beta titanium alloy powder of the eighth embodiment consists essentially of titanium (Ti), vanadium (V), aluminum (Al), chromium (Cr), iron (Fe), oxygen (O) and boron (B). The impurities content of the alpha-beta titanium alloy powder of the second embodiment may be controlled as shown in Table 36.

One specific, non-limiting example of a titanium alloy powder of the eighth embodiment has the composition shown in Table 53.

TABLE 53

| Element | Target (wt %) |
| --- | --- |
| Vanadium | 8.0 |
| Aluminum | 3.5 |
| Chromium | 2.0 |
| Iron | 1.0 |
| Oxygen | 0.12 |
| Boron | 0.09 |
| Titanium | Balance |

In one variation of the eighth embodiment, the disclosed alpha-beta titanium alloy powder may have the composition shown in Table 54.

TABLE 54

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.06-0.14 |
| Boron | 0.08-0.1 |
| Titanium | Balance |

In an eighth embodiment, disclosed is an alpha-beta titanium alloy having the composition shown in Table 55. The example composition of the alpha-beta titanium alloy of the eighth embodiment is an example of a final article made using (e.g., formed from) a titanium alloy powder of the eighth embodiment having the composition shown in Table 52 and subjected to a powder metallurgy process such as the disclosed method 10 (FIG. 1).

TABLE 55

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0.14-0.20 |
| Boron | 0.08-0.1 |
| Titanium | Balance |

Thus, the alpha-beta titanium alloy of the eighth embodiment consists essentially of titanium (Ti), vanadium (V), aluminum (Al), chromium (Cr), iron (Fe), oxygen (O) and boron (B). The impurities content of the alpha-beta titanium alloy melt of the sixth embodiment may be controlled as shown in Table 36.

One specific, non-limiting example of a titanium alloy of the eighth embodiment has the composition shown in Table 56.

TABLE 56

| Element | Target (wt %) |
| --- | --- |
| Vanadium | 8.0 |
| Aluminum | 3.5 |
| Chromium | 2.0 |
| Iron | 1.0 |
| Oxygen | 0.18 |
| Boron | 0.09 |
| Titanium | Balance |

In one variation of the eighth embodiment, the disclosed alpha-beta titanium alloy may have the composition shown in Table 57.

TABLE 57

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.14-0.20 |
| Boron | 0.08-0.1 |
| Titanium | Balance |

In a ninth embodiment, disclosed is an alpha-beta titanium alloy melt having the composition shown in Table 58.

TABLE 58

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0-0.12 |
| Carbon | 0.4-1.0 |
| Titanium | Balance |

Thus, the alpha-beta titanium alloy melt of the ninth embodiment consists essentially of titanium (Ti), vanadium (V), aluminum (Al), chromium (Cr), iron (Fe), oxygen (O) and carbon (C). The impurities content of the alpha-beta titanium alloy melt of the sixth embodiment may be controlled as shown in Table 36.

One specific, non-limiting example of a titanium alloy melt of the ninth embodiment has the composition shown in Table 59.

TABLE 59

| Element | Target (wt %) |
|---|---|
| Vanadium | 8.0 |
| Aluminum | 3.5 |
| Chromium | 2.0 |
| Iron | 1.0 |
| Oxygen | 0.08 |
| Carbon | 1.0 |
| Titanium | Balance |

In one variation of the ninth embodiment, the disclosed alpha-beta titanium alloy melt may have the composition shown in Table 60.

TABLE 60

| Element | Range (wt %) |
|---|---|
| Vanadium | 7.5-8.5 |
| Aluminum | 3.0-4.0 |
| Chromium | 1.8-2.4 |
| Iron | 0.8-1.3 |
| Oxygen | 0.04-0.12 |
| Carbon | 0.4-1.0 |
| Titanium | Balance |

In a ninth embodiment, disclosed is an alpha-beta titanium alloy powder having the composition shown in Table 61. The example composition of the alpha-beta titanium alloy powder of the ninth embodiment is an example of a powdered titanium alloy composition formed from a titanium alloy melt of the ninth embodiment having the composition shown in Table 58 and subjected to an atomization process, such as disclosed in the method 50 (FIG. 2).

TABLE 61

| Element | Range (wt %) |
|---|---|
| Vanadium | 7.5-8.5 |
| Aluminum | 3.0-4.0 |
| Chromium | 0.8-2.4 |
| Iron | 0.8-1.3 |
| Oxygen | 0-0.14 |
| Carbon | 0.4-1.0 |
| Titanium | Balance |

Thus, the alpha-beta titanium alloy powder of the ninth embodiment consists essentially of titanium (Ti), vanadium (V), aluminum (Al), chromium (Cr), iron (Fe), oxygen (O) and carbon (C). The impurities content of the alpha-beta titanium alloy powder of the second embodiment may be controlled as shown in Table 36.

One specific, non-limiting example of a titanium alloy powder of the ninth embodiment has the composition shown in Table 62.

TABLE 62

| Element | Target (wt %) |
|---|---|
| Vanadium | 8.0 |
| Aluminum | 3.5 |

TABLE 62-continued

| Element | Target (wt %) |
|---|---|
| Chromium | 2.0 |
| Iron | 1.0 |
| Oxygen | 0.12 |
| Carbon | 1.0 |
| Titanium | Balance |

In one variation of the ninth embodiment, the disclosed alpha-beta titanium alloy powder may have the composition shown in Table 63.

TABLE 63

| Element | Range (wt %) |
|---|---|
| Vanadium | 7.5-8.5 |
| Aluminum | 3.0-4.0 |
| Chromium | 1.8-2.4 |
| Iron | 0.8-1.3 |
| Oxygen | 0.06-0.14 |
| Carbon | 0.4-1.0 |
| Titanium | Balance |

In an ninth embodiment, disclosed is an alpha-beta titanium alloy having the composition shown in Table 64. The example composition of the alpha-beta titanium alloy of the ninth embodiment is an example of a final article made using (e.g., formed from) a titanium alloy powder of the ninth embodiment having the composition shown in Table 61 and subjected to a powder metallurgy process such as the disclosed method 10 (FIG. 1).

TABLE 64

| Element | Range (wt %) |
|---|---|
| Vanadium | 7.5-8.5 |
| Aluminum | 3.0-4.0 |
| Chromium | 0.8-2.4 |
| Iron | 0.8-1.3 |
| Oxygen | 0.14-0.20 |
| Carbon | 0.4-1.0 |
| Titanium | Balance |

Thus, the alpha-beta titanium alloy of the ninth embodiment consists essentially of titanium (Ti), vanadium (V), aluminum (Al), chromium (Cr), iron (Fe), oxygen (O) and carbon (C). The impurities content of the alpha-beta titanium alloy melt of the sixth embodiment may be controlled as shown in Table 36.

One specific, non-limiting example of a titanium alloy of the ninth embodiment has the composition shown in Table 65.

TABLE 65

| Element | Target (wt %) |
|---|---|
| Vanadium | 8.0 |
| Aluminum | 3.5 |
| Chromium | 2.0 |
| Iron | 1.0 |
| Oxygen | 0.18 |
| Carbon | 1.0 |
| Titanium | Balance |

In a tenth embodiment, disclosed is an alpha-beta titanium alloy melt having the composition shown in Table 66.

TABLE 66

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0-0.12 |
| Boron | 0.08-0.1 |
| Titanium | Balance |

Thus, the alpha-beta titanium alloy melt of the tenth embodiment consists essentially of titanium (Ti), vanadium (V), aluminum (Al), cobalt (Co), iron (Fe), oxygen (O) and boron (B). The impurities content of the alpha-beta titanium alloy melt of the sixth embodiment may be controlled as shown in Table 36.

One specific, non-limiting example of a titanium alloy melt of the tenth embodiment has the composition shown in Table 67.

TABLE 67

| Element | Target (wt %) |
| --- | --- |
| Vanadium | 8.0 |
| Aluminum | 3.5 |
| Cobalt | 1.8 |
| Iron | 1.0 |
| Oxygen | 0.08 |
| Boron | 0.09 |
| Titanium | Balance |

In one variation of the tenth embodiment, the disclosed alpha-beta titanium alloy melt may have the composition shown in Table 68.

TABLE 68

| Element | Range (wt %) |
| --- | --- |
| Vanadium | 7.5-8.5 |
| Aluminum | 3.0-4.0 |
| Cobalt | 1.6-2.0 |
| Iron | 0.8-1.3 |
| Oxygen | 0.04-0.12 |
| Boron | 0.08-0.1 |
| Titanium | Balance |

In a tenth embodiment, disclosed is an alpha-beta titanium alloy powder having the composition shown in Table 69. The example composition of the alpha-beta titanium alloy powder of the tenth embodiment is an example of a powdered titanium alloy composition formed from a titanium alloy melt of the tenth embodiment having the composition shown in Table 66 and subjected to an atomization process, such as disclosed in the method 50 (FIG. 2).

TABLE 69

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0-0.14 |
| Boron | 0.08-0.1 |
| Titanium | Balance |

Thus, the alpha-beta titanium alloy powder of the tenth embodiment consists essentially of titanium (Ti), vanadium (V), aluminum (Al), cobalt (Co), iron (Fe), oxygen (O) and boron (B). The impurities content of the alpha-beta titanium alloy powder of the second embodiment may be controlled as shown in Table 36.

One specific, non-limiting example of a titanium alloy powder of the tenth embodiment has the composition shown in Table 70.

TABLE 70

| Element | Target (wt %) |
| --- | --- |
| Vanadium | 8.0 |
| Aluminum | 3.5 |
| Cobalt | 1.8 |
| Iron | 1.0 |
| Oxygen | 0.12 |
| Boron | 0.09 |
| Titanium | Balance |

In one variation of the tenth embodiment, the disclosed alpha-beta titanium alloy powder may have the composition shown in Table 71.

TABLE 71

| Element | Range (wt %) |
| --- | --- |
| Vanadium | 7.5-8.5 |
| Aluminum | 3.0-4.0 |
| Cobalt | 1.6-2.0 |
| Iron | 0.8-1.3 |
| Oxygen | 0.06-0.14 |
| Boron | 0.08-0.1 |
| Titanium | Balance |

In a tenth embodiment, disclosed is an alpha-beta titanium alloy having the composition shown in Table 72. The example composition of the alpha-beta titanium alloy of the tenth embodiment is an example of a final article made using (e.g., formed from) a titanium alloy powder of the tenth embodiment having the composition shown in Table 69 and subjected to a powder metallurgy process such as the disclosed method 10 (FIG. 1).

TABLE 72

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0.14-0.20 |
| Boron | 0.08-0.1 |
| Titanium | Balance |

Thus, the alpha-beta titanium alloy of the tenth embodiment consists essentially of titanium (Ti), vanadium (V), aluminum (Al), cobalt (Co), iron (Fe), oxygen (O) and boron (B). The impurities content of the alpha-beta titanium alloy melt of the sixth embodiment may be controlled as shown in Table 36.

One specific, non-limiting example of a titanium alloy of the tenth embodiment has the composition shown in Table 73.

TABLE 73

| Element | Target (wt %) |
| --- | --- |
| Vanadium | 8.0 |
| Aluminum | 3.5 |
| Cobalt | 1.8 |

TABLE 73-continued

| Element | Target (wt %) |
|---|---|
| Iron | 1.0 |
| Oxygen | 0.18 |
| Boron | 0.09 |
| Titanium | Balance |

In one variation of the tenth embodiment, the disclosed alpha-beta titanium alloy may have the composition shown in Table 74.

TABLE 74

| Element | Range (wt %) |
|---|---|
| Vanadium | 7.5-8.5 |
| Aluminum | 3.0-4.0 |
| Cobalt | 1.6-2.0 |
| Iron | 0.8-1.3 |
| Oxygen | 0.14-0.20 |
| Boron | 0.08-0.1 |
| Titanium | Balance |

In an eleventh embodiment, disclosed is an alpha-beta titanium alloy melt having the composition shown in Table 75.

TABLE 75

| Element | Range (wt %) |
|---|---|
| Vanadium | 7.5-8.5 |
| Aluminum | 3.0-4.0 |
| Cobalt | 1.2-2.0 |
| Iron | 0.8-1.3 |
| Oxygen | 0-0.12 |
| Carbon | 0.4-1.0 |
| Titanium | Balance |

Thus, the alpha-beta titanium alloy melt of the eleventh embodiment consists essentially of titanium (Ti), vanadium (V), aluminum (Al), cobalt (Co), iron (Fe), oxygen (O) and carbon (C). The impurities content of the alpha-beta titanium alloy melt of the sixth embodiment may be controlled as shown in Table 36.

One specific, non-limiting example of a titanium alloy melt of the eleventh embodiment has the composition shown in Table 76.

TABLE 76

| Element | Target (wt %) |
|---|---|
| Vanadium | 8.0 |
| Aluminum | 3.5 |
| Cobalt | 1.8 |
| Iron | 1.0 |
| Oxygen | 0.08 |
| Carbon | 1.0 |
| Titanium | Balance |

In one variation of the eleventh embodiment, the disclosed alpha-beta titanium alloy melt may have the composition shown in Table 77.

TABLE 77

| Element | Range (wt %) |
|---|---|
| Vanadium | 7.5-8.5 |
| Aluminum | 3.0-4.0 |

TABLE 77-continued

| Element | Range (wt %) |
|---|---|
| Cobalt | 1.6-2.0 |
| Iron | 0.8-1.3 |
| Oxygen | 0.04-0.12 |
| Carbon | 0.4-1.0 |
| Titanium | Balance |

In an eleventh embodiment, disclosed is an alpha-beta titanium alloy powder having the composition shown in Table 78. The example composition of the alpha-beta titanium alloy powder of the eleventh embodiment is an example of a powdered titanium alloy composition formed from a titanium alloy melt of the eleventh embodiment having the composition shown in Table 75 and subjected to an atomization process, such as disclosed in the method 50 (FIG. 2).

TABLE 78

| Element | Range (wt %) |
|---|---|
| Vanadium | 7.5-8.5 |
| Aluminum | 3.0-4.0 |
| Cobalt | 1.2-2.0 |
| Iron | 0.8-1.3 |
| Oxygen | 0-0.14 |
| Carbon | 0.4-1.0 |
| Titanium | Balance |

Thus, the alpha-beta titanium alloy powder of the eleventh embodiment consists essentially of titanium (Ti), vanadium (V), aluminum (Al), cobalt (Co), iron (Fe), oxygen (O) and carbon (C). The impurities content of the alpha-beta titanium alloy powder of the second embodiment may be controlled as shown in Table 36.

One specific, non-limiting example of a titanium alloy powder of the eleventh embodiment has the composition shown in Table 79.

TABLE 79

| Element | Target (wt %) |
|---|---|
| Vanadium | 8.0 |
| Aluminum | 3.5 |
| Cobalt | 1.8 |
| Iron | 1.0 |
| Oxygen | 0.12 |
| Carbon | 1.0 |
| Titanium | Balance |

In one variation of the eleventh embodiment, the disclosed alpha-beta titanium alloy powder may have the composition shown in Table 80.

TABLE 80

| Element | Range (wt %) |
|---|---|
| Vanadium | 7.5-8.5 |
| Aluminum | 3.0-4.0 |
| Cobalt | 1.6-2.0 |
| Iron | 0.8-1.3 |
| Oxygen | 0.06-0.14 |
| Carbon | 0.4-1.0 |
| Titanium | Balance |

In an eleventh embodiment, disclosed is an alpha-beta titanium alloy having the composition shown in Table 81.

The example composition of the alpha-beta titanium alloy of the eleventh embodiment is an example of a final article made using (e.g., formed from) a titanium alloy powder of the eleventh embodiment having the composition shown in Table 78 and subjected to a powder metallurgy process such as the disclosed method 10 (FIG. 1).

TABLE 81

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0.14-0.20 |
| Carbon | 0.4-1.0 |
| Titanium | Balance |

Thus, the alpha-beta titanium alloy of the eleventh embodiment consists essentially of titanium (Ti), vanadium (V), aluminum (Al), cobalt (Co), iron (Fe), oxygen (O) and carbon (C). The impurities content of the alpha-beta titanium alloy melt of the sixth embodiment may be controlled as shown in Table 36.

One specific, non-limiting example of a titanium alloy of the eleventh embodiment has the composition shown in Table 82.

TABLE 82

| Element | Target (wt %) |
| --- | --- |
| Vanadium | 8.0 |
| Aluminum | 3.5 |
| Cobalt | 1.8 |
| Iron | 1.0 |
| Oxygen | 0.18 |
| Carbon | 1.0 |
| Titanium | Balance |

In a twelfth embodiment, disclosed is an alpha-beta titanium alloy melt having the composition shown in Table 83.

TABLE 83

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0-0.12 |
| Boron | 0.08-0.1 |
| Carbon | 0.4-1.0 |
| Titanium | Balance |

Thus, the alpha-beta titanium alloy melt of the twelfth embodiment consists essentially of titanium (Ti), vanadium (V), aluminum (Al), chromium (Cr), iron (Fe), oxygen (O), boron (B) and carbon (C). The impurities content of the alpha-beta titanium alloy melt of the sixth embodiment may be controlled as shown in Table 36.

One specific, non-limiting example of a titanium alloy melt of the twelfth embodiment has the composition shown in Table 84.

TABLE 84

| Element | Target (wt %) |
| --- | --- |
| Vanadium | 8.0 |
| Aluminum | 3.5 |
| Chromium | 2.0 |
| Iron | 1.0 |
| Oxygen | 0.08 |
| Boron | 0.09 |
| Carbon | 1.0 |
| Titanium | Balance |

In one variation of the twelfth embodiment, the disclosed alpha-beta titanium alloy melt may have the composition shown in Table 85.

TABLE 85

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.04-0.12 |
| Boron | 0.08-0.12 |
| Carbon | 0.4-1.0 |
| Titanium | Balance |

In a twelfth embodiment, disclosed is an alpha-beta titanium alloy powder having the composition shown in Table 86. The example composition of the alpha-beta titanium alloy powder of the twelfth embodiment is an example of a powdered titanium alloy composition formed from a titanium alloy melt of the twelfth embodiment having the composition shown in Table 83 and subjected to an atomization process, such as disclosed in the method 50 (FIG. 2).

TABLE 86

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0-0.14 |
| Boron | 0.08-0.1 |
| Carbon | 0.4-1.0 |
| Titanium | Balance |

Thus, the alpha-beta titanium alloy powder of the twelfth embodiment consists essentially of titanium (Ti), vanadium (V), aluminum (Al), chromium (Cr), iron (Fe), oxygen (O), boron (B) and carbon (C). The impurities content of the alpha-beta titanium alloy powder of the second embodiment may be controlled as shown in Table 36.

One specific, non-limiting example of a titanium alloy powder of the twelfth embodiment has the composition shown in Table 87.

TABLE 87

| Element | Target (wt %) |
| --- | --- |
| Vanadium | 8.0 |
| Aluminum | 3.5 |
| Chromium | 2.0 |
| Iron | 1.0 |
| Oxygen | 0.12 |
| Boron | 0.09 |

TABLE 87-continued

| Element | Target (wt %) |
| --- | --- |
| Carbon | 1.0 |
| Titanium | Balance |

In one variation of the twelfth embodiment, the disclosed alpha-beta titanium alloy powder may have the composition shown in Table 88.

TABLE 88

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.06-0.14 |
| Boron | 0.08-0.1 |
| Carbon | 0.4-1.0 |
| Titanium | Balance |

In a twelfth embodiment, disclosed is an alpha-beta titanium alloy having the composition shown in Table 89. The example composition of the alpha-beta titanium alloy of the twelfth embodiment is an example of a final article made using (e.g., formed from) a titanium alloy powder of the twelfth embodiment having the composition shown in Table 86 and subjected to a powder metallurgy process such as the disclosed method 10 (FIG. 1).

TABLE 89

| Element | Range (wt %) |
| --- | --- |
| Vanadium | 7.5-8.5 |
| Aluminum | 3.0-4.0 |
| Chromium | 0.8-2.4 |
| Iron | 0.8-1.3 |
| Oxygen | 0.14-0.20 |
| Boron | 0.08-0.1 |
| Carbon | 0.4-1.0 |
| Titanium | Balance |

Thus, the alpha-beta titanium alloy melt of the twelfth embodiment consists essentially of titanium (Ti), vanadium (V), aluminum (Al), chromium (Cr), iron (Fe), oxygen (O), boron (B) and carbon (C). The impurities content of the alpha-beta titanium alloy melt of the sixth embodiment may be controlled as shown in Table 36.

One specific, non-limiting example of a titanium alloy of the twelfth embodiment has the composition shown in Table 90.

TABLE 90

| Element | Target (wt %) |
| --- | --- |
| Vanadium | 8.0 |
| Aluminum | 3.5 |
| Chromium | 2.0 |
| Iron | 1.0 |
| Oxygen | 0.18 |
| Boron | 0.09 |
| Carbon | 1.0 |
| Titanium | Balance |

In one variation of the twelfth embodiment, the disclosed alpha-beta titanium alloy may have the composition shown in Table 91.

TABLE 91

| Element | Range (wt %) |
| --- | --- |
| Vanadium | 7.5-8.5 |
| Aluminum | 3.0-4.0 |
| Chromium | 1.8-2.4 |
| Iron | 0.8-1.3 |
| Oxygen | 0.14-0.20 |
| Boron | 0.08-0.1 |
| Carbon | 0.4-1.0 |
| Titanium | Balance |

In a thirteenth embodiment, disclosed is an alpha-beta titanium alloy melt having the composition shown in Table 92.

TABLE 92

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0-0.12 |
| Boron | 0.08-0.1 |
| Carbon | 0.4-1.0 |
| Titanium | Balance |

Thus, the alpha-beta titanium alloy melt of the thirteenth embodiment consists essentially of titanium (Ti), vanadium (V), aluminum (Al), cobalt (Co), iron (Fe), oxygen (O), boron (B) and carbon (C). The impurities content of the alpha-beta titanium alloy melt of the sixth embodiment may be controlled as shown in Table 36.

One specific, non-limiting example of a titanium alloy melt of the thirteenth embodiment has the composition shown in Table 93.

TABLE 93

| Element | Target (wt %) |
| --- | --- |
| Vanadium | 7.5 |
| Aluminum | 4.0 |
| Cobalt | 1.8 |
| Iron | 1.2 |
| Oxygen | 0.08 |
| Boron | 0.09 |
| Carbon | 1.0 |
| Titanium | Balance |

In one variation of the thirteenth embodiment, the disclosed alpha-beta titanium alloy melt may have the composition shown in Table 94.

TABLE 94

| Element | Range (wt %) |
| --- | --- |
| Vanadium | 7.5-8.5 |
| Aluminum | 3.0-4.0 |
| Cobalt | 1.6-2.0 |
| Iron | 0.8-1.3 |
| Oxygen | 0.04-0.12 |
| Boron | 0.08-0.1 |
| Carbon | 0.4-1.0 |
| Titanium | Balance |

In a thirteenth embodiment, disclosed is an alpha-beta titanium alloy powder having the composition shown in Table 95. The example composition of the alpha-beta titanium alloy powder of the thirteenth embodiment is an example of a powdered titanium alloy composition formed from a titanium alloy melt of the thirteenth embodiment having the composition shown in Table 92 and subjected to an atomization process, such as disclosed in the method 50 (FIG. 2).

TABLE 95

| Element | Range (wt %) |
| --- | --- |
| Vanadium | 7.5-8.5 |
| Aluminum | 3.0-4.0 |
| Cobalt | 1.2-2.0 |
| Iron | 0.8-1.3 |
| Oxygen | 0-0.14 |
| Boron | 0.08-0.1 |
| Carbon | 0.4-1.0 |
| Titanium | Balance |

Thus, the alpha-beta titanium alloy powder of the thirteenth embodiment consists essentially of titanium (Ti), vanadium (V), aluminum (Al), cobalt (Co), iron (Fe), oxygen (O), boron (B) and carbon (C). The impurities content of the alpha-beta titanium alloy powder of the second embodiment may be controlled as shown in Table 36.

One specific, non-limiting example of a titanium alloy powder of the thirteenth embodiment has the composition shown in Table 96.

TABLE 96

| Element | Target (wt %) |
| --- | --- |
| Vanadium | 8.0 |
| Aluminum | 3.5 |
| Cobalt | 1.8 |
| Iron | 1.0 |
| Oxygen | 0.12 |
| Boron | 0.09 |
| Carbon | 1.0 |
| Titanium | Balance |

In one variation of the thirteenth embodiment, the disclosed alpha-beta titanium alloy powder may have the composition shown in Table 97.

TABLE 97

| Element | Range (wt %) |
| --- | --- |
| Vanadium | 7.5-8.5 |
| Aluminum | 3.0-4.0 |
| Cobalt | 1.6-2.0 |
| Iron | 0.8-1.3 |
| Oxygen | 0.06-0.14 |
| Boron | 0.08-0.1 |
| Carbon | 0.4-1.0 |
| Titanium | Balance |

In a thirteenth embodiment, disclosed is an alpha-beta titanium alloy having the composition shown in Table 98. The example composition of the alpha-beta titanium alloy of the thirteenth embodiment is an example of a final article made using (e.g., formed from) a titanium alloy powder of the thirteenth embodiment having the composition shown in Table 95 and subjected to a powder metallurgy process such as the disclosed method 10 (FIG. 1).

TABLE 98

| Element | Range (wt %) |
| --- | --- |
| Vanadium | 7.5-8.5 |
| Aluminum | 3.0-4.0 |

TABLE 98-continued

| Element | Range (wt %) |
| --- | --- |
| Cobalt | 1.2-2.0 |
| Iron | 0.8-1.3 |
| Oxygen | 0.14-0.20 |
| Boron | 0.08-0.1 |
| Carbon | 0.4-1.0 |
| Titanium | Balance |

Thus, the alpha-beta titanium alloy of the thirteenth embodiment consists essentially of titanium (Ti), vanadium (V), aluminum (Al), cobalt (Co), iron (Fe), oxygen (O), boron (B) and carbon (C). The impurities content of the alpha-beta titanium alloy powder of the second embodiment may be controlled as shown in Table 36.

One specific, non-limiting example of a titanium alloy of the thirteenth embodiment has the composition shown in Table 99.

TABLE 99

| Element | Target (wt %) |
| --- | --- |
| Vanadium | 8.0 |
| Aluminum | 3.5 |
| Cobalt | 1.8 |
| Iron | 1.0 |
| Oxygen | 0.18 |
| Boron | 0.08 |
| Carbon | 1.0 |
| Titanium | Balance |

In one variation of the thirteenth embodiment, the disclosed alpha-beta titanium alloy may have the composition shown in Table 100.

TABLE 100

| Element | Range (wt %) |
| --- | --- |
| Vanadium | 7.5-8.5 |
| Aluminum | 3.0-4.0 |
| Cobalt | 1.6-2.0 |
| Iron | 0.8-1.3 |
| Oxygen | 0.14-0.20 |
| Boron | 0.08-0.1 |
| Carbon | 0.4-1.0 |
| Titanium | Balance |

Articles formed from the disclosed powdered titanium alloy composition may exhibit excellent mechanical properties. Indeed, it is believed that articles formed from powdered forms of the titanium alloy compositions presented in Tables 4, 6 and 9 will exhibit an ultimate tensile strength (ASTM-E8) of at least 130 ksi, a yield strength (ASTM-E8) of at least 120 ksi and an elongation (ASTM-E8) of at least 10 percent, which is comparable to that achieved using wrought or powdered Ti-6Al-4V. Furthermore, it is believed that articles formed from powdered forms of the titanium alloy compositions presented in Tables 4, 6 and 9 will exhibit a fatigue limit of at least 95 ksi, which is comparable to that achieved using wrought Ti-6Al-4V, but significantly better than that achieved using powdered Ti-6Al-4V. Standard fatigue test methods can include, but are not limited to, alternating and mean stress imposed on various fatigue test specimen designs, such as, but not limited to, rotational bending, cantilever flat, axial dog bone, torsion, tension, three (3) or four (4) point bending.

Figure 3:
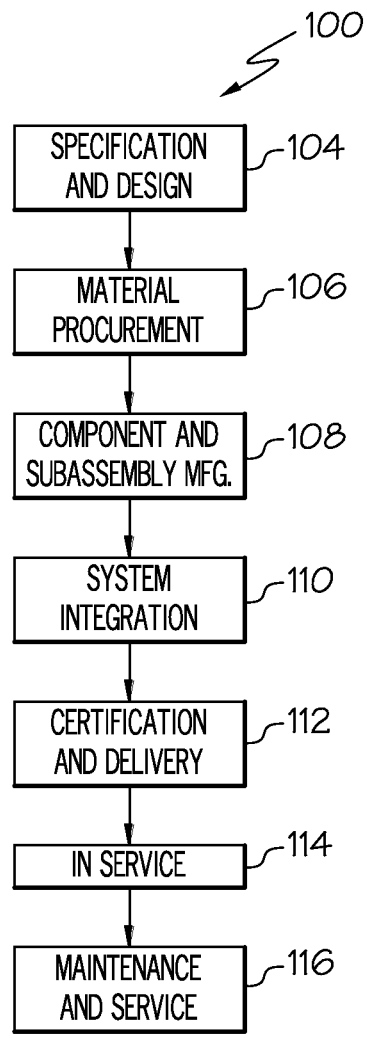
FIG. 3 is a flow diagram of an aircraft manufacturing and service methodology.
Figure 4:
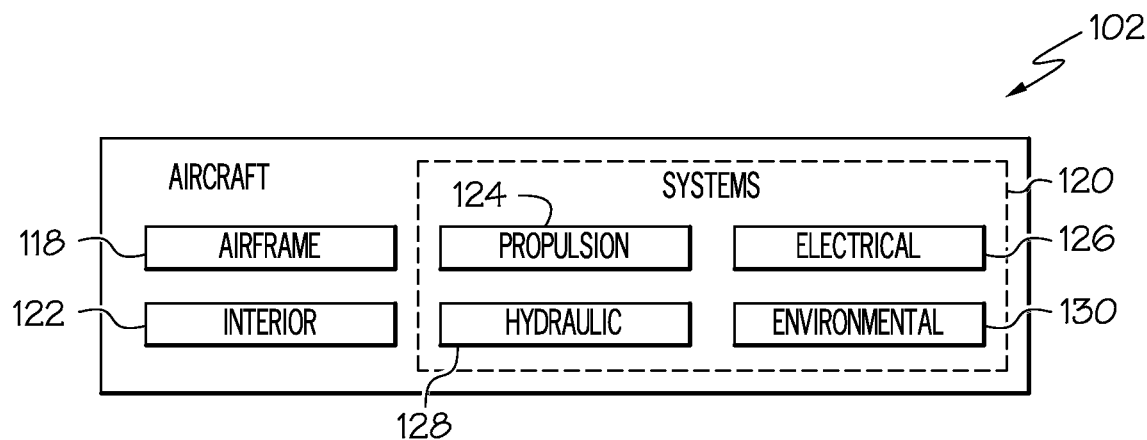
FIG. 4 is a block diagram of an aircraft.

Examples of the disclosure may be described in the context of an aircraft manufacturing and service method 100, as shown in FIG. 3, and an aircraft 102, as shown in FIG. 4. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 4, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included.

The disclosed titanium alloy composition may be employed during any one or more of the stages of the aircraft manufacturing and service method 100. As one example, components or subassemblies corresponding to component/subassembly manufacturing 108, system integration 110, and or maintenance and service 116 may be fabricated or manufactured using the disclosed titanium alloy composition. As another example, the airframe 118 may be constructed using the disclosed titanium alloy composition. Also, one or more apparatus examples, method examples, or a combination thereof may be utilized during component/subassembly manufacturing 108 and/or system integration 110, for example, by substantially expediting assembly of or reducing the cost of an aircraft 102, such as the airframe 118 and/or the interior 122. Similarly, one or more of system examples, method examples, or a combination thereof may be utilized while the aircraft 102 is in service, for example and without limitation, to maintenance and service 116.

The disclosed titanium alloy composition is described in the context of an aircraft; however, one of ordinary skill in the art will readily recognize that the disclosed titanium alloy composition may be utilized for a variety of applications. For example, the disclosed titanium alloy composition may be implemented in various types of vehicle including, for example, helicopters, passenger ships, automobiles, marine products (boat, motors, etc.) and the like.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; item C; item A and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

Although various embodiments of the disclosed titanium alloy composition and article formed therefrom have been shown and described, modifications may occur to those skilled in the art upon reading the specification. The present application includes such modifications and is limited only by the scope of the claims.

What is claimed is:

1. A titanium alloy powder consisting of:
   about 7.0 to about 9.0 percent by weight vanadium;
   4.0 to about 4.5 percent by weight aluminum;
   0.9 to about 1.5 percent by weight iron;
   at most 0.08 percent by weight oxygen; and
   the balance being titanium and impurities.

2. The titanium alloy powder of claim 1 wherein said vanadium is present at about 7.0 to about 8.0 percent by weight.

3. The titanium alloy powder of claim 1 wherein said vanadium is present at about 7.0 to about 8.5 percent by weight.

4. The titanium alloy powder of claim 1 wherein said vanadium is present at about 7.5 to about 8.5 percent by weight.

5. The titanium alloy powder of claim 1 wherein said vanadium is present at about 7.5 to about 9.0 percent by weight.

6. The titanium alloy powder of claim 1 wherein said vanadium is present at about 8.0 to about 9.0 percent by weight.

7. The titanium alloy powder of claim 1 wherein said iron is present at 0.9 to about 1.2 percent by weight.

8. The titanium alloy powder of claim 1 wherein said iron is present at 0.9 to about 1.3 percent by weight.

9. The titanium alloy powder of claim 1 wherein said iron is present at 1.0 to about 1.2 percent by weight.

10. The titanium alloy powder of claim 1 wherein said iron is present at 1.0 to about 1.3 percent by weight.

11. The titanium alloy powder of claim 1 wherein said iron is present at 1.0 to about 1.5 percent by weight.

12. The titanium alloy powder of claim 1 wherein said oxygen is present at about 0.06 to 0.08 percent by weight.

13. The titanium alloy powder of claim 1 wherein the titanium alloy powder is a mixture of at least two distinct powder compositions.

14. The titanium alloy powder of claim 1 wherein the titanium alloy powder is a single powder component, wherein each powder particle of the single powder component has substantially the same composition.

15. The titanium alloy powder of claim 1 compressed into a solid mass.

16. The titanium alloy powder of claim 1 wherein a consolidated powder article formed from the titanium alloy powder exhibits an ultimate tensile strength (ASTM-E8) of at least 130 ksi.

17. The titanium alloy powder of claim 1 wherein a consolidated powder article formed from the titanium alloy powder exhibits a yield strength (ASTM-E8) of at least 120 ksi.

18. The titanium alloy powder of claim 1 wherein a consolidated powder article formed from the titanium alloy powder exhibits an elongation (ASTM-E8) of at least 10 percent.

19. The titanium alloy powder of claim 1 wherein a consolidated powder article formed from the titanium alloy powder exhibits a fatigue limit of at least 95 ksi.

20. A method for using the titanium alloy powder of claim 1, comprising manufacturing an aircraft component from the titanium alloy powder.

21. A method for using the titanium alloy powder of claim 1, comprising manufacturing a medical device component from the titanium alloy powder.

22. A method for using the titanium alloy powder of claim 1, comprising manufacturing an article using powder metallurgy.

23. A method for using the titanium alloy powder of claim 1, comprising manufacturing an article using powder metallurgy combined with forging.

24. A method for using the titanium alloy powder of claim 1, comprising manufacturing an article using powder metallurgy combined with rolling.

25. A method for using the titanium alloy powder of claim 1, comprising manufacturing an article using powder metallurgy combined with extrusion.

26. A method for using the titanium alloy powder of claim 1, comprising manufacturing an article using powder metallurgy combined with welding.

27. A method for using the titanium alloy powder of claim 1, comprising manufacturing an article using additive manufacturing.

28. A method for manufacturing an article, comprising compacting the titanium alloy powder of claim 1 to form a compacted mass.

29. The method for manufacturing an article of claim 28, wherein the step of compacting includes die pressing.

30. The method for manufacturing an article of claim 28, wherein the step of compacting includes cold isostatic pressing.

31. The method for manufacturing an article of claim 28, wherein the step of compacting includes metal injection molding.

32. The method for manufacturing an article of claim 28, wherein the step of compacting includes direct hot isostatic pressing.

33. The method for manufacturing an article of claim 28, further comprising sintering the compacted mass.

34. The method for manufacturing an article of claim 33, wherein the step of sintering the compacted mass includes heating the compacted mass to an elevated temperature in a range of about 2,000° F. to about 2,500° F.

35. The method for manufacturing an article of claim 33, wherein the step of sintering the compacted mass includes heating the compacted mass to an elevated temperature in a range of about 2,000° F. to about 2,500° F. and maintaining the compacted mass at the elevated temperature for at least 60 minutes.

36. The method for manufacturing an article of claim 33, further comprising subjecting the sintered mass to hot isostatic pressing.

37. The method for manufacturing an article of claim 33, further comprising subjecting the sintered mass to hot isostatic pressing at a pressure ranging from about 13 ksi to about 16 ksi and at a temperature ranging from about 1,475° F. to about 1,800° F.

38. The method for manufacturing an article of claim 33, further comprising subjecting the sintered mass to hot isostatic pressing at a pressure ranging from about 13 ksi to about 16 ksi and at a temperature ranging from about 1,475° F. to about 1,800° F. for at least about 60 minutes.

39. The method for manufacturing an article of claim 36, further comprising solution treating the hot isostatic pressed mass.

40. The method for manufacturing an article of claim 36, further comprising solution treating the hot isostatic pressed mass by heating the hot isostatic pressed mass to a temperature ranging from about 1400° F. to about 1725° F.

41. The method for manufacturing an article of claim 36, further comprising solution treating the hot isostatic pressed mass by heating the hot isostatic pressed mass to a temperature ranging from about 1400° F. to about 1725° F. and maintaining at the temperature for approximately 1 hour.

42. The method for manufacturing an article of claim 39, further comprising aging the solution treated mass.

43. The method for manufacturing an article of claim 39, further comprising aging the solution treated mass by heating to a temperature ranging from about 900° F. to about 1400° F.

44. The method for manufacturing an article of claim 39, further comprising aging the solution treated mass by heating to a temperature ranging from about 900° F. to about 1400° F., and maintaining the solution treated mass at the temperature for about 2 hours to about 8 hours.

45. A method for making the titanium alloy powder of claim 1, the method comprising atomizing a titanium alloy melt to form the titanium alloy powder of claim 1.

* * * * *